US011102557B2

(12) United States Patent
McMillan

(10) Patent No.: US 11,102,557 B2
(45) Date of Patent: *Aug. 24, 2021

(54) SYSTEMS, METHODS, AND APPARATUS TO IDENTIFY LINEAR AND NON-LINEAR MEDIA PRESENTATIONS

(71) Applicant: The Nielsen Company (US), LLC, New York, NY (US)

(72) Inventor: F. Gavin McMillan, Tarpon Springs, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,290

(22) Filed: Jul. 31, 2020

(65) Prior Publication Data
US 2020/0366969 A1 Nov. 19, 2020

Related U.S. Application Data

(63) Continuation of application No. 16/741,291, filed on Jan. 13, 2020, now Pat. No. 10,771,862, which is a (Continued)

(51) Int. Cl.
*H04N 21/8352* (2011.01)
*H04N 21/44* (2011.01)
*H04N 21/442* (2011.01)

(52) U.S. Cl.
CPC ... *H04N 21/8352* (2013.01); *H04N 21/44008* (2013.01); *H04N 21/44213* (2013.01)

(58) Field of Classification Search
CPC ......... H04N 21/8352; H04N 21/44008; H04N 21/44213
See application file for complete search history.

(56) References Cited

U.S. PATENT DOCUMENTS

| 4,677,466 A | 6/1987 | Lert, Jr. et al. |
| 5,481,294 A * | 1/1996 | Thomas ................ H04H 20/31 |
| | | 348/180 |

(Continued)

OTHER PUBLICATIONS

United States Patent and Trademark Office, "Non-Final Office Action", issued in connection with U.S. Appl. No. 14/212,646, dated Feb. 26, 2015, 29 pages.

(Continued)

*Primary Examiner* — Kunal Langhnoja
(74) *Attorney, Agent, or Firm* — Hanley, Flight & Zimmerman, LLC

(57) ABSTRACT

Systems, methods, and apparatus to identify linear and non-linear media presentations are disclosed. An example method to determine whether a media presentation is a linear or a non-linear media presentation comprises generating a reference log comprising a first media identifier of first media and a time at which the first media was presented, accessing a media presentation log comprising a second media identifier of second media and a time at which the second media was presented, and determining whether the second media correspond to a linear media presentation or a non-linear media presentation by comparing the media presentation log to the reference log.

20 Claims, 14 Drawing Sheets

Related U.S. Application Data continuation of application No. 16/230,601, filed on Dec. 21, 2018, now Pat. No. 10,567,849, which is a continuation of application No. 15/603,065, filed on May 23, 2017, now Pat. No. 10,194,217, which is a continuation of application No. 14/212,630, filed on Mar. 14, 2014, now Pat. No. 9,693,117.

(60) Provisional application No. 61/791,481, filed on Mar. 15, 2013, provisional application No. 61/922,749, filed on Dec. 31, 2013.

(56) References Cited

U.S. PATENT DOCUMENTS

| | | | |
|---|---|---|---|
| 5,675,510 | A | 10/1997 | Coffey et al. |
| 6,272,176 | B1 | 8/2001 | Srinivasan |
| 7,460,684 | B2 | 12/2008 | Srinivasan |
| 7,609,853 | B2 | 10/2009 | Ramaswamy et al. |
| 7,623,823 | B2 | 11/2009 | Zito et al. |
| 7,643,090 | B2 | 1/2010 | Ramaswamy et al. |
| 7,647,604 | B2 * | 1/2010 | Ramaswamy ......... H04H 60/58 725/9 |
| 7,793,318 | B2 | 9/2010 | Deng |
| 7,797,186 | B2 | 9/2010 | Dybus |
| 7,882,525 | B2 | 2/2011 | Haque |
| 7,984,462 | B2 | 7/2011 | Deng |
| 8,358,966 | B2 | 1/2013 | Zito et al. |
| 8,369,972 | B2 | 2/2013 | Topchy et al. |
| 8,370,201 | B2 | 2/2013 | Cansler et al. |
| 8,600,531 | B2 | 12/2013 | Topchy et al. |
| 9,294,815 | B2 | 3/2016 | McMillan |
| 9,693,117 | B2 | 6/2017 | McMillan |
| 10,003,664 | B2 * | 6/2018 | Wang ................... G06F 16/683 |
| 10,194,217 | B2 | 1/2019 | McMillan |
| 10,567,849 | B2 | 2/2020 | McMillan |
| 2003/0070167 | A1 | 4/2003 | Holtz et al. |
| 2003/0212708 | A1 | 11/2003 | Potrebic et al. |
| 2004/0230994 | A1 | 11/2004 | Urdang et al. |
| 2004/0268413 | A1 | 12/2004 | Reid et al. |
| 2005/0267750 | A1 | 12/2005 | Steuer |
| 2007/0006275 | A1 * | 1/2007 | Wright ..................... A63F 13/25 725/133 |
| 2007/0088764 | A1 | 4/2007 | Yoon et al. |
| 2007/0211170 | A1 | 9/2007 | Ramaswamy et al. |
| 2007/0245243 | A1 | 10/2007 | Lanza et al. |
| 2007/0273754 | A1 | 11/2007 | Cockerton et al. |
| 2009/0256972 | A1 | 10/2009 | Ramaswamy et al. |
| 2010/0325666 | A1 | 12/2010 | Wiser et al. |
| 2011/0314039 | A1 | 12/2011 | Zheleva et al. |
| 2012/0004911 | A1 | 1/2012 | Quan |
| 2012/0047532 | A1 | 2/2012 | McCarthy, III |
| 2013/0007790 | A1 | 1/2013 | McMillan |
| 2014/0259039 | A1 | 9/2014 | Nielsen |
| 2014/0282671 | A1 | 9/2014 | McMillan |
| 2014/0282672 | A1 | 9/2014 | McMillan |
| 2017/0257681 | A1 | 9/2017 | McMillan |
| 2020/0154177 | A1 | 5/2020 | McMillan |

OTHER PUBLICATIONS

United States Patent and Trademark Office, "Final Office Action", issued in connection with U.S. Appl. No. 14/212,646, dated Sep. 8, 2015, 16 pages.

United States Patent and Trademark Office, "Notice of Allowance", issued in connection with U.S. Appl. No. 14/212,646, dated Dec. 18, 2015, 11 pages.

Society of Cable Telecommunication Engineers, "Digital Program Insertion Splicing API," SCTE Engineering Committee, 2009, 58 pages.

Society of Cable Telecommunication Engineers, "Digital Program Insertion Cueing Message for Cable," SCTE Engineering Committee, 2007, 42 pages.

International Searching Authority, "International Search Report and Written Opinion," issued in connection with International Application No. PCT/US2014/029064, dated Jul. 28, 2014, 12 pages.

United States Patent and Trademark Office, "Restriction", issued in connection with U.S. Appl. No. 14/212,630, dated Apr. 10, 2015, 6 pages.

International Bureau, "International Preliminary Report on Patentability," issued in connection with International Application No. PCT/US2014/029064, dated Sep. 24, 2015, 9 pages.

United States Patent and Trademark Office, "Non-Final Office Action", issued in connection with U.S. Appl. No. 14/212,630, dated Apr. 20, 2016, 15 pages.

United States Patent and Trademark Office, "Notice of Allowance", issued in connection with U.S. Appl. No. 14/212,630, dated Apr. 7, 2017, 9 pages.

United States Patent and Trademark Office, "Non-Final Office Action", issued in connection with U.S. Appl. No. 15/603,065, dated Jun. 28, 2018, 21 pages.

United States Patent and Trademark Office, "Notice of Allowance and Fee(s) Due", issued in connection with U.S. Appl. No. 15/603,065, dated Nov. 28, 2018, 14 pages.

United States Patent and Trademark Office, "Non-Final Office Action", issued in connection with U.S. Appl. No. 16/230,601, dated Aug. 21, 2019, 10 pages.

United States Patent and Trademark Office, "Notice of Allowance and Fee(s) Due", issued in connection with U.S. Appl. No. 16/230,601, dated Oct. 7, 2019, 10 pages.

United States Patent and Trademark Office, "Notice of Allowance and Fee(s) Due", issued in connection with U.S. Appl. No. 16/741,291, dated Jun. 15, 2020, 9 pages.

* cited by examiner

SYSTEMS, METHODS, AND APPARATUS TO IDENTIFY LINEAR AND NON-LINEAR MEDIA PRESENTATIONS

RELATED APPLICATIONS

This patent arises from a continuation of U.S. patent application Ser. No. 16/741,291, filed Jan. 13, 2020, which is a continuation of U.S. patent application Ser. No. 16/230,601, filed Dec. 21, 2018, which is a continuation of U.S. patent application Ser. No. 15/603,065, filed May 23, 2017, which is a continuation of U.S. patent application Ser. No. 14/212,630, filed Mar. 14, 2014, which claims priority to U.S. Provisional Patent Application No. 61/791,481, filed Mar. 15, 2013, and to U.S. Provisional Patent Application No. 61/922,749, filed Dec. 31, 2013. The entireties of U.S. patent application Ser. No. 16/741,291, U.S. patent application Ser. No. 16/230,601, U.S. patent application Ser. No. 15/603,065, U.S. patent application Ser. No. 14/212,630, U.S. Provisional Patent Application No. 61/791,481, and U.S. Provisional Patent Application No. 61/922,749 are incorporated by reference herein.

FIELD OF THE DISCLOSURE

This disclosure relates generally to audience measurement, and, more particularly, to systems, methods, and apparatus to identify linear and non-linear media presentations.

BACKGROUND

Linear television has been the model of television distribution in the United States since the 1940's. In a linear television model, a broadcaster schedules programs to air at specific times. Consumers can obtain guides, which could be paper or electronic, to determine what program is being aired at a given time for a given source. Consumers can time shift content from a linear distribution source in a number of ways. Consumer electronic devices like video cassette recorders (VCRs), digital video recorders (DVRs), and personal video recorders (PVRs) allow for the recording of a program at its scheduled time and playback at a later time of choosing of the consumer.

The primary model for monetizing television content has been and continues to be via selling commercials using linear television distribution. Today, that model still dominates with over 68 billion dollars being spent on advertising in linear television for 2011. However, media companies are now using non-linear techniques to distribute media, and are also monetizing such media with commercials.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
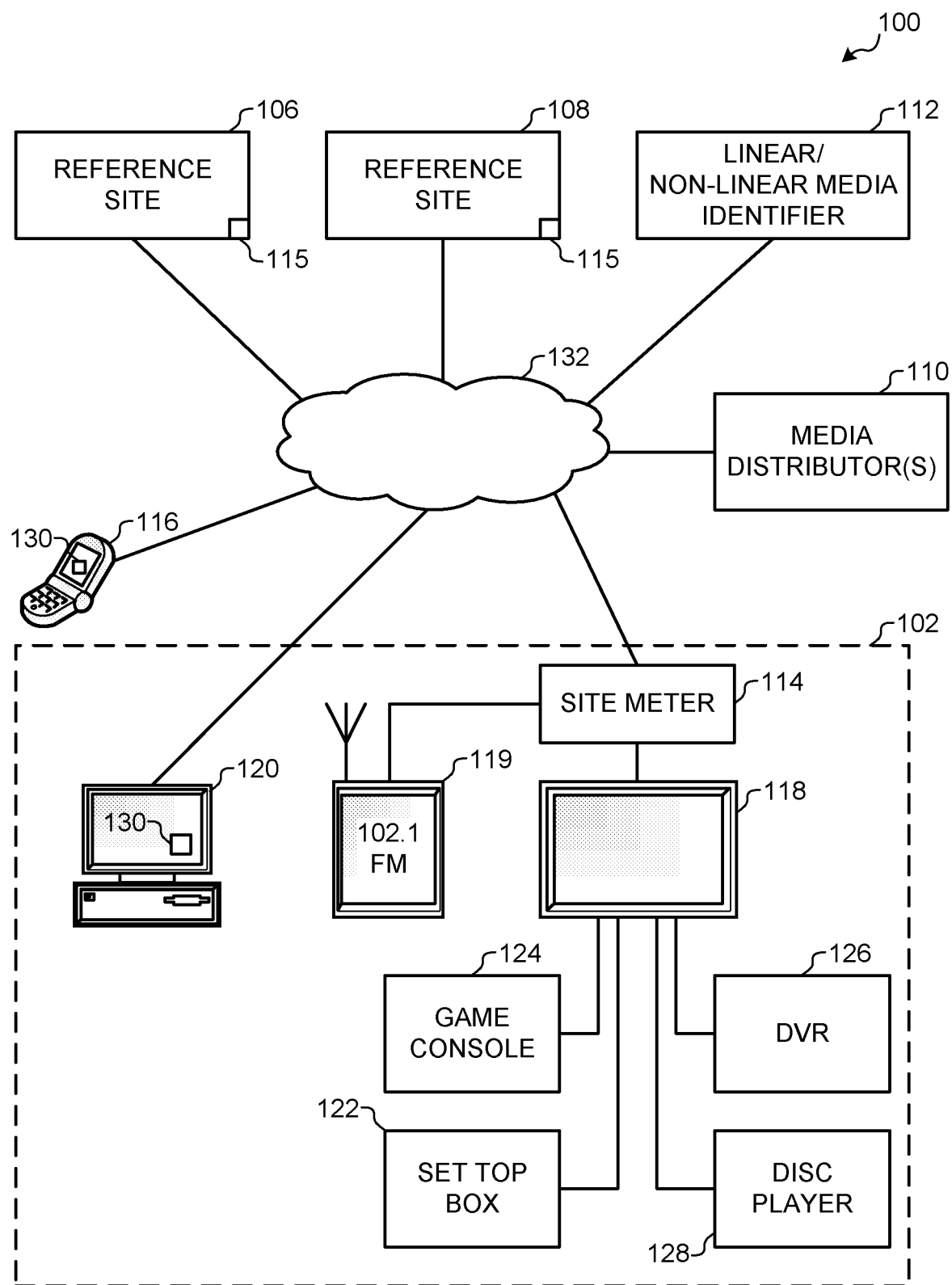
FIG. 1 is block diagram of an example system constructed in accordance with the teachings of this disclosure to identify linear and/or non-linear media presentations.

Distribution of media via non-linear models is gaining popularity. Traditionally, non-linear media distribution has been via physical media, such as VCR tapes, Laser Discs, DVD's and Blu-Ray discs. With the acceptance of broadband Internet into homes, many new services have become increasingly available to consumers to enable access to non-linear content through any of a variety of consumer electronic devices. Services such as Hulu, Netflix, and Amazon Video on Demand (VOD), to name a few, offer consumers the ability to watch media at any given time. Distribution of the media is not tied to any broadcast schedule. Furthermore, the commercials for an episode of a program in the non-linear world are often either not in the same order, fewer, or completely different than the commercials for the same episode of the program in a linear presentation.

Since linear and non-linear advertising may be, and often is, different for a given episode of a program, combining program ratings or viewing numbers from linear and non-linear programs are potentially misleading for advertisers. Advertisers and media companies use linear television ratings in order to set rates for commercials and/or commercial time slots broadcast with a given linear program. As used herein, the term "linear presentations" refers to media presentations in which the viewer is intended to watch scheduled media at the particular time the media is offered, and on the particular channel the media is presented. An example of a linear presentation is traditional radio frequency (RF) broadcast or cable television transmission, in which a media program is scheduled for a particular time slot and with an expectation that, absent recording, the program is to be viewed during that time slot. Media viewed via a recording device and/or a presentation in response to a specific request (e.g., video on demand) are considered to be non-linear presentations (e.g., time-shifted presentation) depending on the nature of the subsequent viewing as described below. Examples of non-linear presentations include a time-shifted media presentation using a digital video recorder (DVR), a personal video recorder, a video cassette recorder, and/or another video recording and/or time-shifting device, and/or Video on Demand services such as streaming Internet video on demand (e.g., YouTube, Netflix, Hulu, etc.) and/or video on demand via a set top box and/or a television provider.

Example methods and apparatus disclosed herein distinguish between exposure to linear programs and exposure to non-linear programs. The distinctions determined using example methods and apparatus disclosed herein can be used to correctly determine audiences for different commercial advertisements presented via linear and non-linear presentation of media.

Example media measurement platforms disclosed herein differentiate between program and non-program media, and use such information to compare a user's exposure to and/or consumption of media to the media which was distributed (e.g., available) in the linear domain. Program media is any media which is part of the content of the program (e.g., a movie, a television show). A program typically includes an introduction, body and credits. Non-program media includes media such as a commercial creative, promotion, public service announcement, and/or other such types of media which are not part of the content of a television program, although they may be interleaved with the program content during broadcast or other transmission. By finding and analyzing the order of the program and non-program media exposed to a given user based on a reference source, example methods and apparatus disclosed herein determine whether that media is from a linear source. If no non-program media is found, or no alignment with program and non-program media is found, example methods and apparatus disclosed herein determine the media exposed to the user to be presented via a non-linear source.

To classify a media presentation as linear and/or non-linear, example methods and apparatus use media measurement meters and/or device meters. Meters can be hardware devices, hardware plus software devices, and/or software only where the meter software is installed on a consumer electronics device (e.g., a personal computer, a mobile device, a tablet computer, a set top box (STB), etc.). In some examples, the meter collects and time stamps audio fingerprints corresponding to media played in the monitored environment at the granularity necessary to match reference data and identify the individual media. Meters collect data, and periodically and/or aperiodically send data to a system for processing. In some examples, the meter data is matched against the reference system in a manner that increases efficiency by, for example, only considering the distribution sources to which a home has access and/or attempting to match against linear distribution sources before attempting other matching (e.g., against time-shifted sources). Results from the matching process are either (1) "no match," meaning there is no identifiable media exposure of interest occurring, or (2) one or more media identifiers listed (and, in some examples, time stamped) in the order of detection.

To increase the efficiency of determining whether media presentations are linear or non-linear presentations, example methods and apparatus disclosed herein first attempt to match a media presentation with linear (e.g., live) sources of distribution (e.g., based on the timestamp the meter associates with the fingerprint of the media in question). If a match occurs with a linear source, both the distributor and the media being distributed have been identified. If there is no match in the linear domain, logs for available distribution sources which are receivable by the monitored devices are searched. Example methods and apparatus disclosed herein compare media identifiers generated by the meter to reference media identifiers in reference logs. Where matches of media identifiers occur, the results of the matches are passed to a presentation classifier. Example methods and apparatus disclosed herein apply rules to classify viewing as originating from a linear source or a non-linear source. An example of such a rule is: "for any duration of metered viewing where non-program media occurs in the reference, the meter data must show that at least a threshold portion (e.g., eighty percent) of the non-program media was detected in the same order as detected on the reference system (as recorded in a reference log)." Example media identifiers include an audio watermark detected in the media and/or an audio signature (i.e., fingerprint) inherent to the media.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio component of the media. In some examples, the audio component is selected to have a signal characteristic sufficient to hide the watermark from human detection (e.g., the code is masked from hearing). This is sometimes referred to as stenographic or psychoacoustic encoding. In addition to or as an alternative to audio watermarking, video watermarking may be employed. Video watermarking embeds a code (preferably hidden from human visual detection) in the video component of media. As used herein, the terms "code" or "watermark" are used interchangeably and are defined to mean any identification information (e.g., an identifier, metadata, etc.) that may be inserted or embedded in the audio and/or video of media (e.g., a program or advertisement) for the purpose of identifying the media and/or for another purpose such as tuning (e.g., a packet identifying header). As used herein "media" refers to audio and/or visual (still or moving) content and/or advertisements. To identify watermarked media, the watermark(s) are extracted and compared to a table of reference watermarks that are mapped to media identifying information.

Another type of media identifier used in example methods and apparatus disclosed herein is signatures or fingerprints. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). Good signatures are repeatable when processing the same media presentation, but are unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were disclosed in Thomas, U.S. Pat. No. 5,481, 294, which is hereby incorporated by reference in its entirety.

FIG. 1 is a block diagram of an example system 100 constructed in accordance with the teachings of this disclosure to identify linear and/or non-linear media presentations. The example system 100 of FIG. 1 may be used to distinguish between exposure to linear airings of media and exposure to non-linear media. By identifying or distinguishing between linear and non-linear media presentations, the example system 100 of FIG. 1 generates more accurate ratings of program media (e.g., television shows, advertisements, etc.) across multiple presentation platforms (e.g., television, time-shifted viewing, streaming media presentations, etc.). For example, rather than grouping linear presentation audiences and non-linear presentation audiences for a program under a same measurement, the example system 100 of FIG. 1 determines which presentations (and, thus, audience members) are linear presentations and which presentations (and, thus, audience members) are non-linear presentations. Because different presentation platforms may present different non-program media (e.g., advertisements) in association with a same program, the example system 100 of FIG. 1 provides advertisers with more accurate data regarding the viewership of its advertisements across different distribution media (e.g., cable, satellite, over-the-air television broadcast, physical storage media, Internet, on demand, etc.).

The example system 100 of FIG. 1 includes a presentation site (e.g., a household) 102, reference sites 106, 108, media distributor(s) 110, and a linear/non-linear media identifier 112. Each of the example presentation site 102 and the reference sites 106, 108 includes a site meter 114, 115. The example system 100 further includes a mobile media presentation device 116, which may be associated with the presentation site 102 (e.g., owned, leased, and/or used by a person associated with the presentation site 102).

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

Panelists are users registered on panels maintained by a ratings entity (e.g., an audience measurement entity or company) that owns and/or operates the ratings entity subsystem. People become panelists via, for example, a user interface presented on a media device such as a computer (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

The example presentation site 102 of FIG. 1 is associated with a panelist and includes a television 118, a radio 119, and a computing device 120 (collectively referred to as media presentation devices). The media presentation devices 118-120 present media selected by persons (e.g., panelists) associated with the presentation site 102. The television 118 may present media from any of multiple media sources, such as a cable or satellite set top box 122, a video game console 124, a DVR 126, a disc player 128 (e.g., Blu-ray disc, DVD, CD, etc.), and/or any other media source including, for example, the computing device 120. The radio 119 may present media such as radio stations broadcast over RF. The example computing device 120 of FIG. 1 may be a personal computer, a laptop computer, a mobile device (e.g., a cell phone, a smart phone, a tablet such as an iPad™), a personal digital assistant (PDA), an Internet appliance, and/or any other type of computing device.

The site meter 114 at the presentation site 102 monitors media presented via the media presentation device(s) 118-120. In the example of FIG. 1, the site meter 114 monitors media presented via the television by, for example, capturing free field audio to detect audio codes or watermarks in presented media, generating signatures from audio and/or video output by the television 118, detecting blank frames and/or cue tones inserted in presented media streams, detecting logos present in presented media, and/or any other method of monitoring media presentations on the television 118. Examples of metering devices that may be used to implement the site meter 114 of FIG. 1 are described in U.S. Pat. Nos. 7,690,853 and 7,643,090, and U.S. patent application Ser. No. 13/791,432. The entireties of U.S. Pat. Nos. 7,690,853, 7,643,090 and U.S. patent application Ser. No. 13/791,432 are hereby incorporated by reference.

The example computing device 120 of the illustrated example includes a device meter 130 to monitor media presented via the computing device 120. The device meter 130 may monitor media presentations that cannot be monitored using the site meter 114. Examples of device meters that may be used to implement the device meter 130 of FIG. 1 are described in U.S. Pat. No. 5,675,510. The entirety of U.S. Pat. No. 5,675,510 is hereby incorporated by reference. In some other examples, the computing device 120 is communicatively coupled to the site meter 114 or another meter external to the computing device 120.

The example site meter 114 and the example device meter 130 generate media presentation logs of events representative of media presentations via the respective media presentation devices 118-120. The media presentation logs include timestamps identifying times associated with the occurrence of the events in the logs. The site meter 114 and the device meter 130 of the illustrated example periodically or aperiodically transmit the media presentation logs they generate to the linear/non-linear media identifier 112 via a network 132 (e.g., the Internet). The example site meter 114 associated with the presentation site 102 monitors media presentations occurring via, for example, the television 118 at the presentation site 102 and provides media presentation logs to the linear/non-linear media identifier 112.

The example reference site meters 115 associated with the reference sites 106, 108 generate reference logs (similar to the media presentation logs) for linear media sources. For example, the reference sites 106, 108 may include one or more media presentation devices and/or reference site meters 115 to monitor linear media presentations for media sources of interest. In some examples, the media sources of interest include all available linear media sources (e.g., all cable channels, broadcast channels, and/or satellite channels available to the reference site). In some other examples, the media sources of interest include a selected subset of available linear media sources. In the example of FIG. 1, the reference sites 106, 108 are selected to have access to linear media sources in a manner that is representative of the programming available to the presentation site 102. For example, the reference sites 106, 108 may be physically located in a same media distribution region and have access to the same media distributor(s) 110 (e.g., local multiple system operators (MSOs) such as cable and/or satellite operators) as the monitored presentation site 102.

In some examples, the site meters 114, 115 capture, record, and/or generate media identifying information and timestamps at which the media identifying information was captured and/or generated. Example media identifying information that may be captured and/or recorded includes audio and/or video watermark codes, cue tones in the audio track of the media, blank frames or blank frames in the video of the media, and/or logos overlaid over the video portion of program media (and not present in non-program media). Example media identifying information that may be generated by the site meters 114, 115 also include signatures or fingerprints representative of the media.

The example linear/non-linear media identifier 112 of FIG. 1 receives and/or generates the reference log(s) (from the reference site meters 115) and the media presentation log(s) (from the site meters 114) and determines whether media presentations at the presentation site 102 are linear or non-linear media presentations. To determine whether a media presentation is a linear or a non-linear media presentation, the example linear/non-linear media identifier 112 compares a generated or received media presentation log to one or more reference logs, as described in more detail below. Using media identifiers, the example linear/non-linear media identifier 112 identifies media items (e.g., program content, advertisements, etc.) in a media presentation as program media and/or non-program media. The example linear/non-linear media identifier 112 also applies rules to classify the media presentations as linear and/or non-linear media presentations as explained below.

Figure 2:
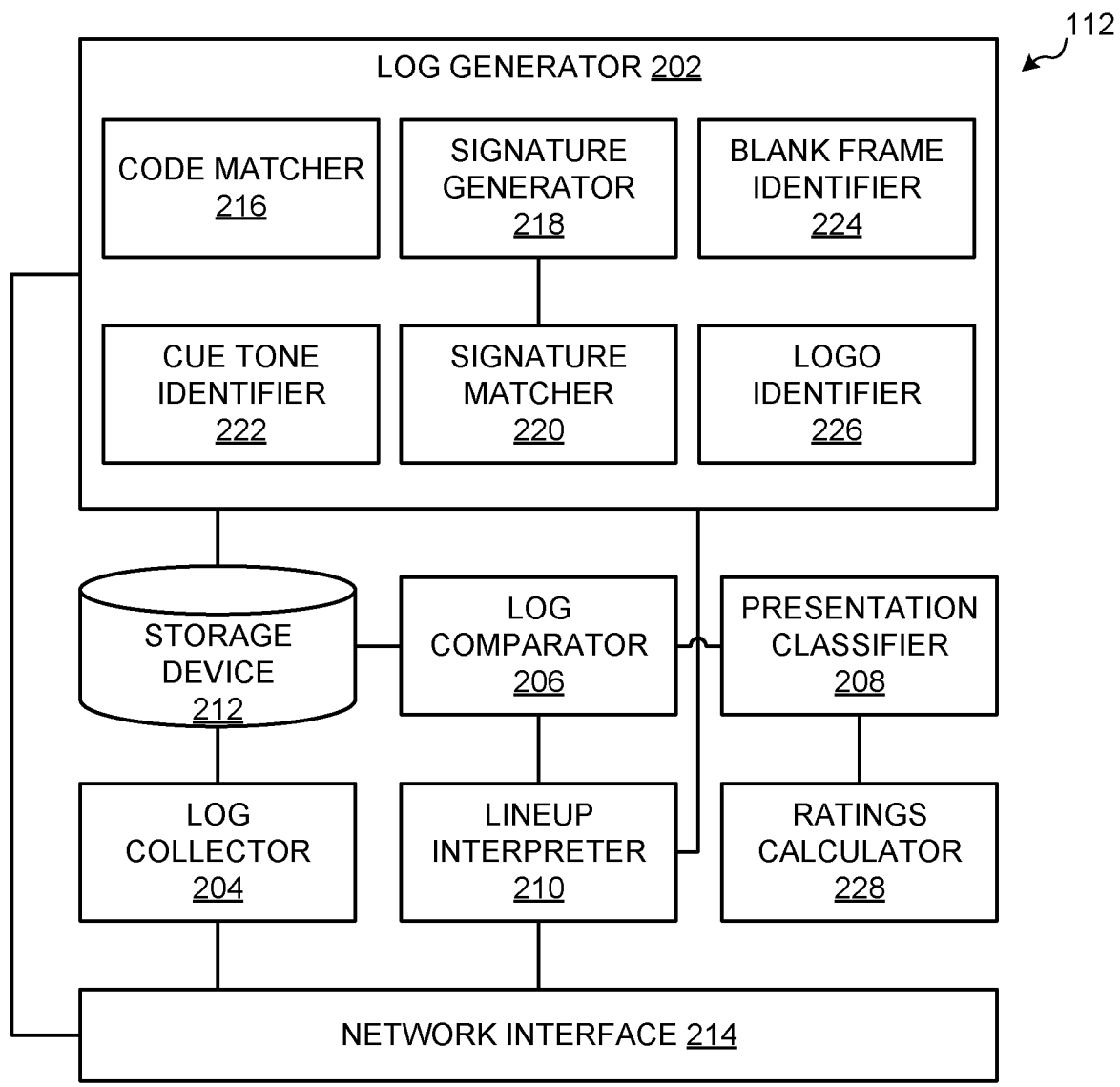
FIG. 2 is a block diagram of an example implementation of the example linear/non-linear media identifier of FIG. 1.

FIG. 2 is a block diagram of an example implementation of the example linear/non-linear media identifier 112 of FIG. 1. The example linear/non-linear media identifier 112 of FIG. 2 includes a log generator 202, a log collector 204, a log comparator 206, a presentation classifier 208, a lineup interpreter 210, a storage device 212, a network interface 214, and a ratings calculator 228.

As mentioned above, the example linear/non-linear media identifier 112 determines whether media in a media presentation detected at a presentation site 102 (e.g., a panelist site, household, etc.) is program media or non-program media. The example log generator 202 of FIG. 2 generates one or more reference logs representative of linear media. The log generator 202 generates reference logs to include indications of linear presentations of program media and non-program media (e.g., unique identifiers of program and non-program media) and the times at which the program media and non-program media (e.g., advertisements) were presented in a linear manner. In some examples, the log generator 202 further indicates or distinguishes the media source(s) for the program media and non-program media when reference logs are generated for multiple media source(s). The reference logs are used for comparison with presentation logs generated based on media presented at the presentation site 102.

The example log generator 202 of FIG. 2 generates the presentation logs and/or reference logs based on information collected by the site meters 114, 115 and/or the device meter 130. For example, the log generator 202 generates presentation logs based on media (e.g., audio and/or video data) detected by the site meter 114 and/or by the device meter 130, and generates reference log(s) based on media (e.g., audio and video data) received from the site meter(s) 115 of FIG. 1. To generate reference log(s) and/or presentation log(s), the example log generator 202 includes a code matcher 216, a signature generator 218, a signature matcher 220, a cue tone identifier 222, a blank frame identifier 224, and a logo identifier 226. In some examples, the log generator 202 may use a subset including one or more of the code matcher 216, the signature generator 218, the signature matcher 220, the cue tone identifier 222, the blank frame identifier 224, and/or the logo identifier 226 to generate the reference logs.

The example code matcher 216, the example signature generator 218, the example signature matcher 220, the example cue tone identifier 222, the example blank frame identifier 224, and/or the example logo identifier 226 generate events based on processing the media. The example log generator 202 classifies the events (e.g., identified and/or matched codes, generated and/or matched signatures, identified cue tones, identified blank frames, and/or identified logos) as being associated with program media and/or non-program media. Based on the information in an event (or sequence of events), the example log generator 202 logs a type of the event (e.g., program media, non-program media), a time at which the event was observed (e.g., a time at which the portion of the media stream was captured), an identifier of the media associated with the event (if the media is identifiable), and a source identifier for the event (e.g., a channel on which the captured media stream is presented).

The example code matcher 216 of FIG. 2 monitors audio and/or video of media to extract embedded codes or watermarks. The embedded codes detected by the code matcher 216 may be codes such as those inserted into media streams for audience measurement activities. Code systems identify items of media (e.g., episodes of a program, advertisements, etc.) by embedding unique codes (e.g., binary codes) in the corresponding media. Thus, by identifying the code embedded in the media, the media can be identified using, for example, a lookup table. Examples of a code system that may be used to implement the code matcher 216 include the NAES II system, the NAES V system, and/or the NAES VI system used by The Nielsen Company (US), LLC, to perform television audience measurement and the CBET system used by Arbitron. U.S. Pat. Nos. 6,272,276 and 8,369,972 are hereby incorporated by reference in their entireties. However, other audio and/or video codes may be detected from the media using one or more other code systems. The example code matcher 216 queries the storage device 212, which contains mappings of codes to media (e.g., codes to media identifiers), to identify the media corresponding to the extracted code(s). By identifying the media using the codes, the example code matcher 216 determines whether a media item is program media (e.g., a television show, a movie, or other content) or non-program media (e.g., an advertisement, a public service announcement, etc.).

When the code matcher 216 identifies a code that matches a known code, the example code matcher 216 populates a reference log or presentation log with an event entry including an indication that the identified media associated with the code is program media or non-program media, a timestamp of the media, an identification of a source of the media, and an identifier of the media. The code matcher 216 of FIG. 2 may combine multiple consecutive codes into a single entry if, for example, the consecutive codes are associated with the same media (e.g., program, commercial, etc.). In some examples, the entry associated with combined codes includes a time duration instead of a timestamp of one point in time. Example instructions to identify program media and non-program media based on matching codes are described below with reference to FIG. 9.

The example signature generator 218 of FIG. 2 generates signatures, such as strings of bits, numbers, and/or characters, that represent all or a portion of an item of media. The example signature generator 218 may utilize a signaturing method that is robust against background (e.g., environmental) noise, media presentation quality, noise (e.g., interference, distribution effects, etc.) and/or distortion of the media. In some examples, the signature generator 218 generates one or more signatures to represent a particular duration of media. Thus, a media item may be represented by a number of signatures based on the total duration of the media item. The signature generator 218 may generate signatures from an audio portion, a video portion, and/or a combination of the audio and video portions of a media item.

The example signature matcher 220 compares the signatures generated by the signature generator 218 to a database of reference signatures representative of known media. The example storage device 212 of FIG. 2 may implement a reference signature database. If a threshold number of signatures match reference signatures stored in the database for a media item, the example signature matcher 220 determines that the media matches the reference media associated with the reference signatures. By generating the signatures and identifying the media using the generated signatures, the example signature generator 218 and the signature matcher 220 determine whether a media item is program media or non-program media. Example methods and apparatus that may be used to implement the example signature generator 218 and/or the signature matcher 220 of FIG. 2 are described in U.S. Pat. No. 8,600,531. However, other signaturing methods and/or apparatus may be used in addition or as an alternative to such methods and apparatus. The entirety of U.S. Pat. No. 8,600,531 is hereby incorporated by reference.

When the signature matcher 220 identifies a signature that matches a known signature, the example signature matcher 220 populates a reference log or presentation log with an event entry including an indication that the identified media associated with the signature is program media or non-program media, a timestamp of the media, an identification of a source of the media, and an identifier of the media. The signature matcher 220 of FIG. 2 may combine multiple consecutive signatures into a single event if, for example, the consecutive signatures are associated with the same media (e.g., program, commercial, etc.). Example instructions to identify program media and non-program media based on matching signatures are described below with reference to FIG. 10.

The example cue tone identifier 222 of FIG. 2 monitors an audio portion of the media for cue tones indicative of non-program media insertions into a media stream. Media distributors (e.g., the media distributors 110 of FIG. 1) often insert commercials with the use of one or more cue tones. Cue tones are audio tones in the audio track of a media stream that indicate when a commercial insertion should occur. Cue tones may be carried in the Secondary Audio Program (SAP) channel and/or in the primary audio channel of a media stream. Media streams provided to the media distributors 110 of FIG. 1 for distribution may include distinct, predetermined sequence(s) of cue tones to indicate or mark where the media distributors 110 are to insert non-program media such as advertisements. An example method to use cue tones for media insertion into a media stream (e.g., digital program insertion of digital cue tones) is described in the Society of Cable Television Engineers (SCTE) 30 and SCTE 35 standards. The SCTE 30 and SCTE 35 standards enable accurate media insertions (e.g., by the media distributor(s) 110) using a presentation time stamp (PTS). The PTS data is delivered ahead of the commercial insertion to indicate a frame-accurate insertion point in the digital stream. By decoding the digital cue tone information, the example cue tone identifier 222 uses the information to derive the time(s) at which non-program media begin.

When the cue tone identifier 222 successfully identifies an insertion cue, the example cue tone identifier 222 of FIG. 2 timestamps the event and stores the event in a reference log or presentation log. In the example of FIG. 2, the cue tone identifier 222 logs non-program events, because the cue tones are generally used to signal the placement of commercials or other non-program media. For example, the cue tone identifier 222 may log an event that indicates a time period of the non-program media as being between a first time at which the cue tone was presented in the media and a second time at which a next event is identified (e.g., a next cue tone, a blank frame, an identified code or signature, etc.). Example instructions to identify program media and non-program media based on cue tones are described below with reference to FIG. 11.

The example blank frame identifier 224 identifies non-program media by detecting a 'fade to black' frame in a media stream. For example, a video frame comprising a single color (usually black, although other colors can be used) is inserted into the media stream (e.g., by a programmer of the media stream) provided to the media distributor 110 to provide a commercial insertion point. Thus, blank frame identification may be used in addition to or as an alternative to cue tone detection. By detecting the blank or 'fade to black' frame, the example blank frame identifier 224 derives the time(s) at which non-program media begin. On identifying a blank frame, the example blank frame identifier 224 of FIG. 2 timestamps the event and stores the event in a reference log or presentation log. Example methods and apparatus for detecting a blank frame are described in U.S. Pat. No. 7,984,462. The entirety of U.S. Pat. No. 7,984,462 is hereby incorporated by reference.

When the example blank frame identifier 224 of FIG. 2 successfully identifies a blank frame, the blank frame identifier 224 timestamps the event and stores the event in a reference log or presentation log. In the example of FIG. 2, the blank frame identifier 224 logs non-program events because, like cue tones, the blank frames are generally used to signal the placement of commercials or other non-program media. For example, the blank frame identifier 224 may log an event that indicates a time period of the non-program media as being between a first time at which the blank frame was presented in the media and a second time at which a next event is identified (e.g., a next cue tone, a next blank frame, an identified code or signature, etc.). Example instructions to identify program media and non-program media based on blank frames are described below with reference to FIG. 11.

The example logo identifier 226 of FIG. 2 detects logos present in a media stream. Some programmers and/or media distributors overlay a small logo on the program media. In contrast, the logos may not be placed on commercials. For media sources that perform such logo overlays, the example logo identifier 226 detects logo images that do not change for at least a threshold time (e.g., the logo remains for several minutes). By detecting the logos, the example logo identifier 226 derives the time(s) during which program media is presented and the time(s) during which non-program media is presented. On identifying the logo and determining the time(s) at which the logo is present, the example logo identifier 226 of FIG. 2 timestamps and/or records the time range of the event and stores the event in a reference log or presentation log. Example methods and apparatus for detecting a logo are described in U.S. Pat. No. 7,643,090.

When the logo identifier 226 successfully identifies a logo in the media stream, the example logo identifier 226 of FIG. 2 timestamps the event and stores the event in a reference log or presentation log. In the example of FIG. 2, the logo identifier 226 logs program events, because detected logos are generally presented as network or station identifiers during the presentation of program media. For example, the logo identifier 226 may log an event that indicates a time period of program media as being between a start time of detection of the logo in the media and a next end time of detection of the logo in the media. In some examples, the event logged with the logo identifier 226 is populated with a media identifier based on code(s) and/or signature(s) that are captured during the presentation of the logo and matched to known code(s) and/or signature(s) by the code matcher 216 and/or the signature matcher 220.

In some examples, the log generator 202 rounds or conforms the event duration (e.g., timestamped start and/or end periods) of non-program events to a nearest standardized non-program duration (e.g., 15 seconds, 30 seconds, 60 seconds, etc.). The example cue tone identifier 222, the example blank frame identifier 224, and/or the example logo identifier 226 may not be capable of identifying program or non-program media. In some examples, the example cue tone identifier 222, the example blank frame identifier 224, and/or the example logo identifier 226 are used in combination with the code matcher 216 and/or the signature matcher 220 to a) determine a precise time boundary of an event entry (e.g., via the cue tone identifier 222, the blank frame identifier 224, and/or the logo identifier 226) and to b) determine a media identifier for the event entry (e.g., via the code matcher 216 and/or the signature matcher 220). In other examples, the example cue tone identifier 222, the example blank frame identifier 224, and/or the example logo identifier 226 are used in combination with a schedule of media to match a media source and time to the schedule (which includes a mapping of media sources and times to media and/or media identifiers) to determine a corresponding media identifier.

Figure 3:
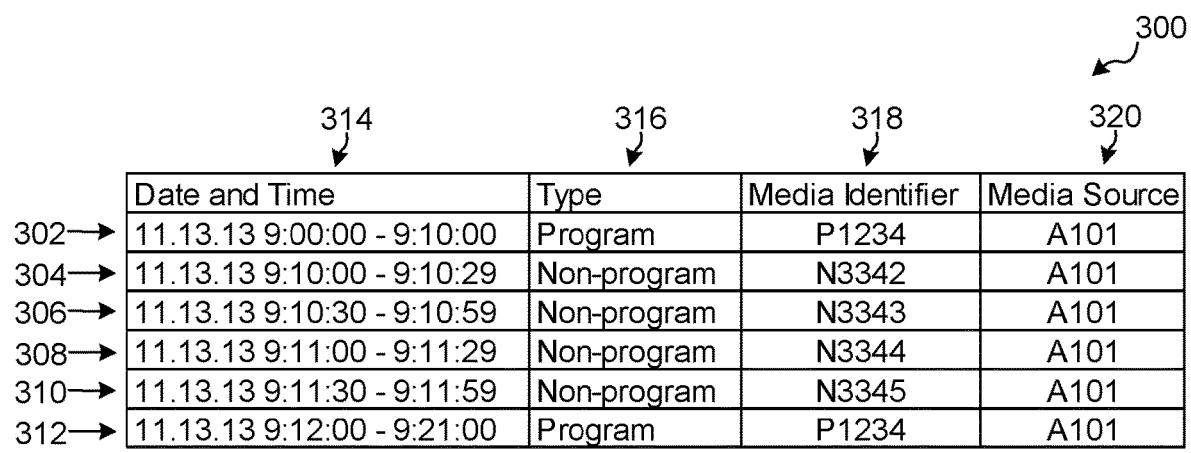
FIG. 3 is an example reference log for a first media source that may be generated by the example linear/non-linear media identifier and/or the site meters of FIGS. 1 and/or 2.
Figure 4:
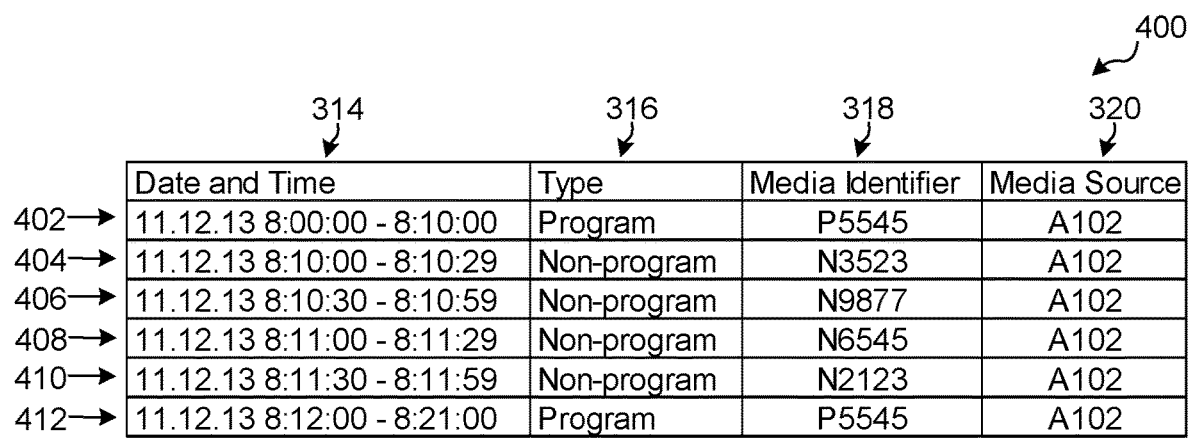
FIG. 4 is an example reference log for a second media source that may be generated by the example linear/non-linear media identifier and/or the site meters of FIGS. 1 and/or 2.

FIG. 3 illustrates an example reference log 300 for a first media source (e.g., a first television channel) that may be generated by the example linear/non-linear media identifier 112 and/or the site meters 115 of FIGS. 1 and/or 2. FIG. 4 illustrates an example reference log 400 for a second media source (e.g., a second television channel) that may be generated by the example linear/non-linear media identifier 112 and/or the site meters 115. The example log comparator 206 and/or the example presentation classifier 208 use the reference logs 300, 400 to determine whether media presentations (represented by presentation logs) presented at presentation sites (e.g., the presentation site 102 of FIG. 1) are linear media presentations or non-linear media presentations.

The example reference log 300 of FIG. 3 includes events 302, 304, 306, 308, 310, and 312. The example reference log 400 of FIG. 4 includes events 402, 404, 406, 408, 410, and 412. Each of the events 302-312, 402-412 in the example reference logs 300, 400 includes a timestamp 314, a media type 316 (e.g., program media or non-program media), a media identifier 318, and a source identifier 320. In some examples, the source identifier 320 may be omitted from the reference log 300 and, instead, the reference log 300 as a whole may be associated with the appropriate media source. In such examples, a different reference log is generated and/or populated for each media source (e.g., channel). The reference logs 300, 400 represent linear media presentations and, thus, media presentations may be matched to the reference logs to determine whether they are linear or non-linear media presentations.

Figure 5:
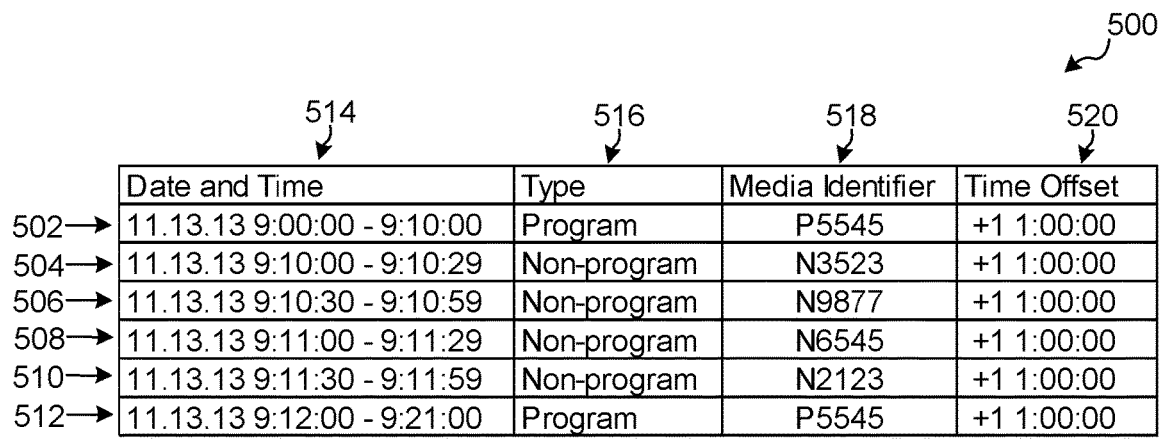
FIG. 5 is an example media presentation log for a first media presentation device that may be generated by the example linear/non-linear media identifier, the site meters, and/or the media presentation devices of FIGS. 1 and/or 2.

FIG. 5 illustrates an example media presentation log 500 for a first media presentation device (e.g., the television 118 viewing a channel via the set top box 122) that may be generated by the example linear/non-linear media identifier 112, the site meters 114, and/or the media presentation devices 116, 120 of FIGS. 1 and/or 2. The example media presentation log 500 of FIG. 5 includes entries 502, 504, 506, 508, 510, 512, each of which includes a timestamp 514 (e.g., date and time), a media type 516, a media identifier 518, and a time offset 520.

The timestamp 514 reflects the date and time (or time range) in which the media represented by the entry 502-512 was observed. The media type 516 indicates whether the entry is classified as program media or non-program media.

The media identifier 518 is a unique identifier of the media item, and should have the same media identifier as other presentations of the media item. The time offset 520 indicates a difference or delay from a linear presentation of the media corresponding to the media entry 502-512 (e.g., determined from the reference logs 300, 400, or from a database of linear presentations) to a later presentation of the media at the presentation site 102. For example, the entry 502 of FIG. 5 was presented from 9:00:00 AM to 9:10:00 AM on Nov. 13, 2013, is identified as program media having a media identifier P5545, and was presented one day and 1:00:00 hours after an identified linear presentation of the media corresponding to the media identifier P5545.

Figure 6:
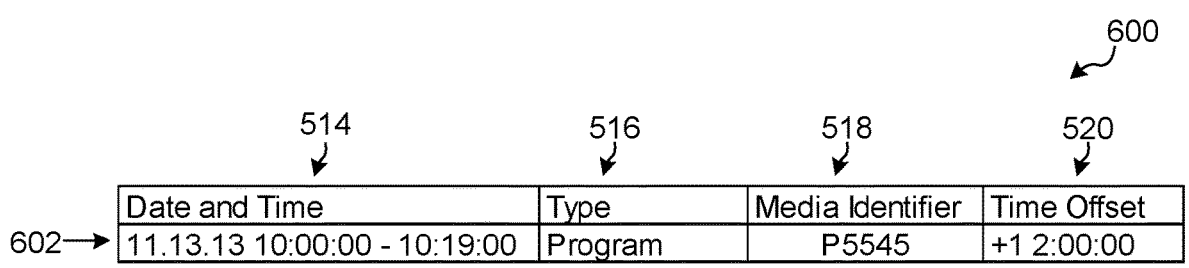
FIG. 6 is an example media presentation log for a second media presentation device that may be generated by the example linear/non-linear media identifier, the site meters, and/or the media presentation devices of FIGS. 1 and/or 2.

FIG. 6 is an example media presentation log 600 for a second media presentation device (e.g., the mobile device 116, the computing device 120) that may generated by the example linear/non-linear media identifier 112, the site meters 114, the media presentation devices 116, 120, and/or the device meter 130 of FIGS. 1 and/or 2. The example media presentation log includes an entry 602 having the timestamp 514, the media type 516, the media identifier 518, and the time offset 520 fields. The example entry 602 includes an identified program presented contiguously during 10:00:00-10:19:00 on Nov. 13, 2013.

The example timestamps 514 in the presentation logs 500, 600 represent a time and date at which the media associated with an event 502-512, 602 was observed (by the site meter 114 and/or the device meter 130). The example media type 516 identifies whether the media associated with the event 502-512, 602 is program media or non-program media. The example media identifier 518 includes an identifier 518 of the media (e.g., a unique identifier of an item of media, such as a program, episode, advertisement, etc.). In some examples, the presentation logs 500, 600 of FIG. 5 and further specifies a type of device and/or a unique identifier of the device at which the media was observed.

The example log generator 202 of FIG. 2 generates the reference log 300 based on media identifying information received from the site meter 115 associated with the first example reference site 106 and generates the reference log 400 based on media identifying information received from the site meter 115 associated with the second example reference site 108 of FIG. 1. Additionally or alternatively, the log generator 202 generates the presentation log 500 based on media identifying information received from the site meter 114 of FIG. 1 and/or generates the presentation log 600 based on media identifying information received from the mobile media presentation device 116. For example, the log generator 202 generates the event entries 302-312, 402-412, 502-512, 602 based on codes identified by the code matcher 216, signatures (e.g., audio fingerprints) identified by the signature matcher 220, cue tones identified by the cue tone identifier 222, blank frames identified by the blank frame identifier 224, and/or logos identified by the logo identifier 226 based on media identifying information received from the site meter 115. Examples of logging events based on the code matcher 216, the signature matcher 220, the cue tone identifier 222, the blank frame identifier 224, and/or the logo identifier 226 are described above.

In some examples, the site meters 114, 115 and/or the device meter 130 implement a log generator 202 to generate presentation logs and/or reference logs and transmit the logs to the linear/non-linear media identifier 112. The example log collector 204 of FIG. 2 collects reference logs and/or presentation logs from meters (e.g., the site meters 114, 115 of FIG. 1, the device meters 130 of FIG. 1). In some examples, the log collector 204 collects presentation logs and the log generator 202 generates the reference logs. The log collector 204 stores the received or collected logs in a log storage (e.g., the storage device 212).

The example log comparator 206 attempts to identify a partial or complete match between ones of the presentation logs and ones of the reference logs by comparing the presentation logs to the reference logs. For example, the log comparator 206 may compare the contents of the collected and/or generated presentation logs (e.g., log entries representative of observed media items) to the log entries in reference logs and/or to media identified in one or more media databases. For example, the log comparator 206 may compare logs generated by the log generator 202, logs collected by the log collector 204, and/or logs stored in the storage device 212. In some examples, the log comparator 206 filters the reference logs to be compared by determining which media sources, reference logs, and/or events represent linear media streams that a presentation site 102 (associated with a presentation log under consideration) can access or present.

In some examples, the example log comparator 206 of FIG. 2 prioritizes an order of comparison of presentation logs to reference logs by first comparing a presentation log to linear media sources occurring at the times indicated by the timestamps in the presentation log, and then comparing the presentation log to non-linear media sources when media items and/or events in the presentation log do not match any of the reviewed linear media sources. For example, the log comparator 206 may select an event or set of events from the presentation log, determine the timestamp(s) of the event(s), and compare the event(s) (e.g., extracted code(s), signature(s), combination(s) of cue tone(s), logo(s), blank frame(s), and/or other identifiers) to events in the reference log(s) having similar timestamp(s) to identify matching patterns. If the events are not matched to linear media, the example log comparator 206 may attempt to match the events to non-linear media sources, such as Internet-based media sources, video-on-demand media sources, and/or any other source or repository of program media and/or non-program media.

In an example of comparing a presentation log to a reference log, the example log comparator 206 may compare the presentation log 500 of FIG. 5 to the reference logs 300 and 400 of FIGS. 3 and 4 to attempt to determine whether the presentation log 500 represents a linear or a non-linear presentation of media. Between the logs 300 and 400 (and/or any additional reference logs for comparison), the example log comparator 206 selects the example reference log 300 of FIG. 3 for a first comparison because the timestamps 314 of the events 302-312 in the reference log 300 match (e.g., within a tolerance based on, for example, possible broadcast or other distribution delays) corresponding timestamps 514 of the events 502-512 in the presentation log 500. Because live television may be the most common manner of viewing at the time and/or location of collection of the media from which the log generator 202 generates the reference log 300, the events 302-312 in the reference log 300 may have the highest likelihood of matching the events 502-512 in the presentation log 500.

The example log comparator 206 compares the first event 502 of the presentation log 500 to the first event 302 of the reference log 300 based on the events 302, 502 having same timestamp starting times (e.g., within a window or tolerance). The log comparator 206 determines that the events 302 and 502 are both program media (e.g., due to both events 302 and 502 having a "program" media type 316, 516), but also determines that the events 302 and 502 do not represent the same program media (e.g., due to the events 302 and 502 having different media identifiers 318, 518). Because the events 302 and 502 do not represent the same program media, the example log comparator 206 determines that the events do not match. The example log comparator 206 identifies similar pairs of events 304 and 504, 306 and 506, 308 and 508, 310 and 510, and 312 and 512 based on similar timestamp matching, and performs comparisons for the pairs of events 304 and 504, 306 and 506, 308 and 508, 310 and 510, and 312 and 512. Based on the comparisons of the pairs of events, the log comparator 206 determines that these pairs of events do not match because each event in each pair is identified as different media. In some examples, the log comparator 206 also compares the events 502-512 in the presentation log 500 to events 302-312 in the reference log 300 to determine whether the presentation log 500 matches the reference log 300 with a time offset (e.g., where the media presentation associated with the log 500 was presented with a time delay).

After determining that the presentation log 500 does not match the reference log 300, the example log comparator 206 determines whether the presentation log 500 matches any other reference logs 300 having same or similar timestamps as the events 502-512 (e.g., whether the presentation log 500 corresponds to a live presentation). If the log comparator 206 determines that the presentation log 500 does not match any reference logs representative of events occurring at the same time as the presentation log events 502-512, the example log comparator 206 compares the presentation log 500 to other reference log(s) (e.g., events occurring prior to the events 502-512 in the presentation log 500).

Continuing with the example, the example log comparator 206 compares the presentation log 500 to the reference log 400 of FIG. 4. The log comparator 206 compares the event 502 of the presentation log 500 to the example event 402 of the reference log 400. Because the duration (determined from the timestamps 314, 514), the media types 316, 516, and the media identifiers 318, 518 of the events 402 and 502 match, the example log comparator 206 determines that the events 402 and 502 match. In some other examples, events are considered to match when a subset of the fields 314-318, 514-518 match and/or key ones of the fields 314-318, 514-518 match. The log comparator 206 of the illustrated example further determines an offset 520 of the event 502 to be one day and one hour (e.g., +1 1:00:00). The example log comparator 206 further determines that the event pairs 404 and 504, 406 and 506, 408 and 508, 410 and 510, and 412 and 512 match based on the timestamps 314, 514, media types 316, 516, and media identifiers 318, 518 match between the pairs of events.

Based on the partial and/or complete matches identified by the log comparator 206, the example presentation classifier 208 of FIG. 2 classifies the media presentations in the presentation logs as linear media presentations or non-linear media presentations. In some examples, the presentation classifier 208 may classify a media presentation as not containing media of interest and, therefore, as neither a linear nor non-linear media presentation. To classify the media presentations, the example presentation classifier 208 applies one or more classification rules to the matched events. An example classification rule states that, for any duration of a monitored presentation in which non-program media occurs in the reference log, the non-program media in the presentation log data must match at least a threshold portion (e.g., eighty percent) of the non-program media in the matching reference log data in the same order as provided in the reference log.

The following example of determining whether a match between a presentation log and a reference log represents a linear or non-linear media presentation continues the matching example discussed above with reference to FIGS. 3, 4, and 5. Based on the identification of a match by the example log comparator 206, the presentation classifier 208 determines that, for the contiguous duration represented by the events 502-512, at least a threshold portion of the duration of the events 502-512 has matching media identifiers 318, 518 between corresponding pairs of the events 402-412, 502-512 (e.g., 402 and 502, 404 and 504, etc.). In the illustrated example, 100% of the duration of the events 502-512 has a media identifier 518 matching its corresponding event 402-412 in the reference log 400. In some other examples, one or more events 502-512 in the presentation log 500 may represent personalized media (e.g., personalized advertisements) delivered to the presentation site 102. Such events, which are shown at the presentation site 102 but not at the reference sites 1066, 108, may cause less than 100%, but more than a threshold duration (e.g., 80%) of the duration of the events 502-512 to match. When the matching portion of the duration satisfies the threshold, the example presentation classifier 208 determines that the media presentation represented by the events 502-512 is a linear presentation.

The example presentation log 600 of FIG. 6 represents a presentation of a program associated with media identifier P5545 at another presentation site. The example log comparator 206 determines that the example media identifier 518 of the presentation log 600 matches the media identifier 318 of the reference log 400 of FIG. 4 (e.g., based on matching codes and/or matching signatures in the reference media and the presented media). However, the example presentation classifier 208 determines that the presentation log 600 of FIG. 6 is not a linear media presentation (e.g., is a non-linear media presentation) because a) less than a threshold duration of the events 402-412 matches the duration of the event 602 of the presentation log 600 and/or b) the sequence of program and non-program events (e.g., the program event 602) in the presentation log 600 does not match the sequence of program and non-program events 402-412 of the reference log 400.

Lineup information may be used by the log generator 202 and/or the log comparator 206 to identify reference media and/or media presented at the presentation site 102. The example lineup interpreter 210 of FIG. 2 receives lineup information from the media distributor(s) 110 of FIG. 1 and interprets the lineup information to identify the program media presented in linear presentations at particular times and on particular channels. For example, the lineup interpreter 210 may receive (e.g., via the network interface 214 of FIG. 2 and/or the network 132 of FIG. 1) a lineup containing a listing of programs being presented at the times and media sources accessible to the presentation site 102 and the reference sites 106, 108 from the media distributor 110. Additionally or alternatively, lineup information may be generated by and received from the Nielsen Automated Monitoring of Lineup (AMOL) system using the reference sites 115. Example lineup information includes a title of a program, the time slot during which the program is distributed, a source of the program (e.g., a network or local affiliate, a channel, etc.) and, for some program media, an identifier of an episode of a program.

The example lineup interpreter 210 of FIG. 2 processes lineup data by matching to obtain identifiers of program media that may be used to uniquely identify the program media in reference logs and/or media presentation logs. The lineup interpreter 210 may then update the reference logs with the appropriate media identifier corresponding to the time and media source in a reference log entry. For example, the lineup interpreter 210 may add an identifier of the program media to a reference log based on timestamp(s) of the program media. In some examples, the lineup interpreter 210 does not identify non-program media because non-program media identification information is not provided in the received lineup. However, the lineup interpreter 210 may identify the non-program media in the reference log using a lineup that identifies non-program media.

The example storage device 212 of FIG. 2 may include one or more physical and/or logical storage devices to store the reference logs and/or presentation logs. In the example of FIG. 2, the storage device 212 further implements a code or watermark database (e.g., a lookup table) and/or a signature database.

The example network interface 214 includes the physical and logical components for communicating with the example site meters 114, 115, the mobile media presentation device 116, and/or the computing device 120 via the network 132 of FIG. 1.

The presentation logs may be associated with respective counts of audience members (and/or associated demographic information) at the presentation site 102. For example, the site meter 114 and/or the device meter 130 of FIG. 1 may be capable of identifying panelists who are present for media presentations and including the panelist identification in the presentation log(s) (e.g., with each event in a log). The example ratings calculator 228 of FIG. 2 calculates ratings and/or other media presentation information for linear and/or non-linear media presentations based on the linear media presentations and non-linear media presentations identified by the presentation classifier 208. For example, the ratings calculator 228 determines a number of linear presentations by counting the media presentation logs containing identified linear presentations of the media of interest. Additionally or alternatively, the ratings calculator 228 determines a number of non-linear presentations by counting the media presentation logs containing identified non-linear presentations of the media of interest.

The example ratings calculator 228 scales the counted number(s) of linear and/or non-linear media presentations by a scaling factor, where the scaling factor is based on the representative qualities of the panel from which the presentation logs were collected with respect to a population to be measured. For example, in some cases the ratings calculator 228 augments traditional television and/or online audience measurement data by classifying observed presentations of media at panelist locations and/or devices as linear and/or non-linear presentations. In some examples, the ratings calculator 228 uses the scaled or raw counted linear presentations in combination with additional audience measurement data. The example ratings calculator 228 may generate any other applicable types of ratings information from the identified linear and/or non-linear media presentation identifications.

In an example, the ratings calculator 228 determines that a media presentation at a panelist household (e.g., the presentation site 102) is a linear presentation of media having identifier P5545. The example ratings calculator 228 determines a number of audience members present at the site 102 during the presentation (e.g., using any past, present, and/or future method(s) of counting audience members) and adds the number of audience members to the determination of total ratings for the identified media. In another example, the ratings calculator 228 determines that another media presentation at the panelist household is a non-linear presentation of media. The example ratings calculator 228 determines a number of audience members present at the site 102 during the presentation and adds the number of audience members to a determination of a non-linear audience of the media (e.g., an online audience, a time-shifted audience, etc.). By differentiating between the linear and non-linear media presentations for determining ratings of media, the example ratings calculator 228 can provide a more accurate measurement of the viewership of media other than the media of interest to the viewer, such as advertisements, presented intermittently with a program or other media.

While the example linear/non-linear media identifier 112 of FIG. 2 is described above as including the log generator 202, any of the site meters 114, 115 associated with the presentation site 102 and/or the reference sites 106, 108 may include a corresponding log generator 202 to generate presentation log(s) and/or reference log(s). In such examples, the system 100 may conserve network resources by reducing (e.g., transforming, representing) the presented media streams and/or the reference media streams to representative logs and/or media identifying information, instead of providing the entireties of the media streams to the linear/non-linear media identifier 112 for conversion to presentation log(s) and/or reference log(s). In some examples, one or more of the reference site(s) 106, 108 are co-located with the linear/non-linear media identifier 112 such that the linear/non-linear media identifier 112 receives media (e.g., audio and/or video) from the site meter(s) 115.

While an example manner of implementing the linear/non-linear media identifier 112 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example site meters 114, 115, the example mobile media presentation device 116, the example computing device 120, the example device meter 130, the example log generator 202, the example log collector 204, the example log comparator 206, the example presentation classifier 208, the example lineup interpreter 210, the example storage device 212, the example network interface 214, the example code matcher 216, the example signature generator 218, the example signature matcher 220, the example cue tone identifier 222, the example blank frame identifier 224, the example logo identifier 226, the example ratings calculator 228 and/or, more generally, the example linear/non-linear media identifier 112 and/or the example system 100 of FIGS. 1 and/or 2 may be implemented by hardware, software, firmware and/or any combination of hardware, software and/or firmware. Thus, for example, any of the example site meters 114, 115, the example mobile media presentation device 116, the example computing device 120, the example device meter 130, the example log generator 202, the example log collector 204, the example log comparator 206, the example presentation classifier 208, the example lineup interpreter 210, the example storage device 212, the example network interface 214, the example code matcher 216, the example signature generator 218, the example signature matcher 220, the example cue tone identifier 222, the example blank frame identifier 224, the example logo identifier 226, the example ratings calculator 228 and/or, more generally, the example linear/non-linear media identifier 112 and/or the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example site meters 114, 115, the example mobile media presentation device 116, the example computing device 120, the example device meter 130, the example log generator 202, the example log collector 204, the example log comparator 206, the example presentation classifier 208, the example lineup interpreter 210, the example storage device 212, the example network interface 214, the example code matcher 216, the example signature generator 218, the example signature matcher 220, the example cue tone identifier 222, the example blank frame identifier 224, the example logo identifier 226, and/or the example ratings calculator 228 is/are hereby expressly defined to include a tangible computer readable storage device or storage disk such as a memory, a digital versatile disk (DVD), a compact disk (CD), a Blu-ray disk, etc. storing the software and/or firmware. Further still, the example linear/non-linear media identifier 112 of FIGS. 1 and/or 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the linear/non-linear media identifier 112, the site meters 114, 115, the media presentation devices 116, 120, the device meters 130, the example log generator 202, the example log collector 204, the example log comparator 206, the example presentation classifier 208, the example lineup interpreter 210, the example storage device 212, the example network interface 214, the example code matcher 216, the example signature generator 218, the example signature matcher 220, the example cue tone identifier 222, the example blank frame identifier 224, the example logo identifier 226, and/or the example ratings calculator 228 of FIGS. 1 and 2 are shown in FIGS. 7, 8, 9, 10, 11, 12, 13, 14, and/or 15. In this example, the machine readable instructions comprise programs for execution by a processor such as the processor 1612 shown in the example processor platform 1600 discussed below in connection with FIG. 6. The programs may be embodied in software stored on a tangible computer readable storage medium such as a CD-ROM, a floppy disk, a hard drive, a digital versatile disk (DVD), a Blu-ray disk, or a memory associated with the processor 1612, but the entire programs and/or parts thereof could alternatively be executed by a device other than the processor 1612 and/or embodied in firmware or dedicated hardware. Further, although the example programs are described with reference to the flowcharts illustrated in FIGS. 7, 8, 9, 10, 11, 12, 13, 14, and 15, many other methods of implementing the example linear/non-linear media identifier 112, the site meters 114, 115, the media presentation devices 116, 120, the device meters 130, the example log generator 202, the example log collector 204, the example log comparator 206, the example presentation classifier 208, the example lineup interpreter 210, the example storage device 212, the example network interface 214, the example code matcher 216, the example signature generator 218, the example signature matcher 220, the example cue tone identifier 222, the example blank frame identifier 224, the example logo identifier 226, and/or the example ratings calculator 228 may alternatively be used. For example, the order of execution of the blocks may be changed, and/or some of the blocks described may be changed, eliminated, or combined.

As mentioned above, the example processes of FIGS. 7, 8, 9, 10, 11, 12, 13, 14, and/or 15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7, 8, 9, 10, 11, 12, 13, 14, and/or 15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
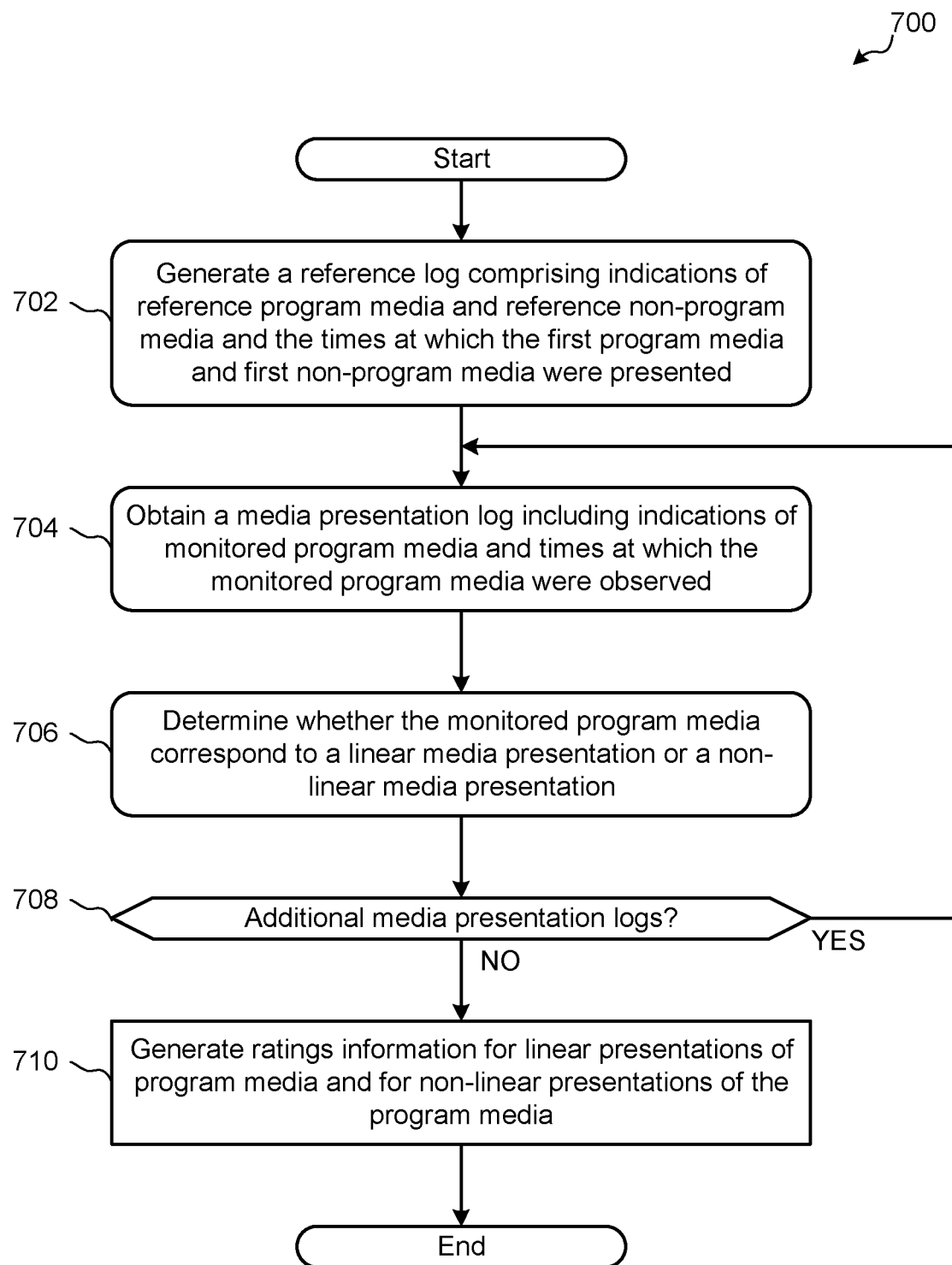
FIG. 7 is a flowchart representative of example machine readable instructions that may be performed by the example linear/non-linear media identifier of FIGS. 1 and/or 2 to identify linear and/or non-linear media presentations.

FIG. 7 is a flowchart representative of example machine readable instructions 700 that may be performed by the example linear/non-linear media identifier 112 of FIGS. 1 and/or 2 to identify linear and/or non-linear media presentations.

The example linear/non-linear media identifier 112 generates (e.g., via the log generator 202 of FIG. 2) a reference log that includes indications of reference program media and reference non-program media, and the times at which the reference program media and reference non-program media were presented (block 702). Example reference logs 300, 400 that may be generated by the linear/non-linear media identifier 112 are disclosed above with reference to FIGS. 3 and 4. Example instructions that may be performed to implement block 702 are disclosed below with reference to FIG. 8.

The example linear/non-linear media identifier 112 obtains a media presentation log including indications of monitored program media and times at which the monitored program media were observed (block 704). In some examples, the log collector 204 of FIG. 2 receives the media presentation log from a site meter 114 and/or from a media presentation device 116, 120 (e.g., via the network 132 of FIG. 1 and/or the network interface 214 of FIG. 2). In some other examples, the log generator 202 generates the media presentation log from media identifying information received from a presentation site 102. Example instructions that may be performed to implement block 704 are disclosed below with reference to FIG. 8. Example media presentation logs 500, 600 that may be generated or received by the linear/non-linear media identifier 112 are disclosed above with reference to FIGS. 5 and 6.

The example linear/non-linear media identifier 112 determines whether the monitored program media correspond to a linear media presentation or a non-linear media presentation (block 706). For example, the log comparator 206 compares program media and/or non-program media in the media presentation log to reference logs to determine matching sets of presentation log events and reference log events. The example presentation classifier 208 applies matching rules to determine whether matches between program media and non-program media indicate that the media presentation logs reflect linear media presentations or non-linear media presentations. Example instructions that may be performed to implement block 706 are disclosed below with reference to FIG. 13.

The example linear/non-linear media identifier 112 determines whether there are additional media presentation logs to be processed (block 708). If there are additional media presentation logs (block 708), control returns to block 704 to obtain another media presentation log. When there are no additional media presentation logs to be processed (block 708), the example linear/non-linear media identifier 112 generates ratings information for linear presentations of program media and non-linear presentations of program media (block 710). For example, the ratings calculator 228 of FIG. 2 may determine a number of linear presentations and a number of non-linear presentations of an item of program media by counting identified linear presentations having a selected media identifier. The example ratings calculator 228 further determines ratings information by extrapolating or scaling the linear presentations into ratings for linear viewership containing first set(s) of non-program media. The example ratings calculator 228 determines non-linear presentation audiences (e.g., online audiences) by extrapolating or scaling the non-linear presentations and their respective audiences into ratings for non-linear viewership using a scaling factor (e.g., based on the panel representation of a population of interest).

By performing the example instructions 700 of FIG. 7, the example linear/non-linear media identifier 112 can provide, among other things, a calculation of the audience of advertisements for linear presentations of a program (e.g., to provide advertisers with an accurate estimation of the audience of the advertisements presented during the linear presentation of the media), a calculation of the audience of non-linear (e.g., on demand, time-shifted, etc.) presentations of the program (e.g., to determine audience interest in on demand or other non-linear modes of viewing), and/or a calculation of a total linear and non-linear audience of the program (e.g., to determine a total interest or popularity of a media item).

Figure 8:
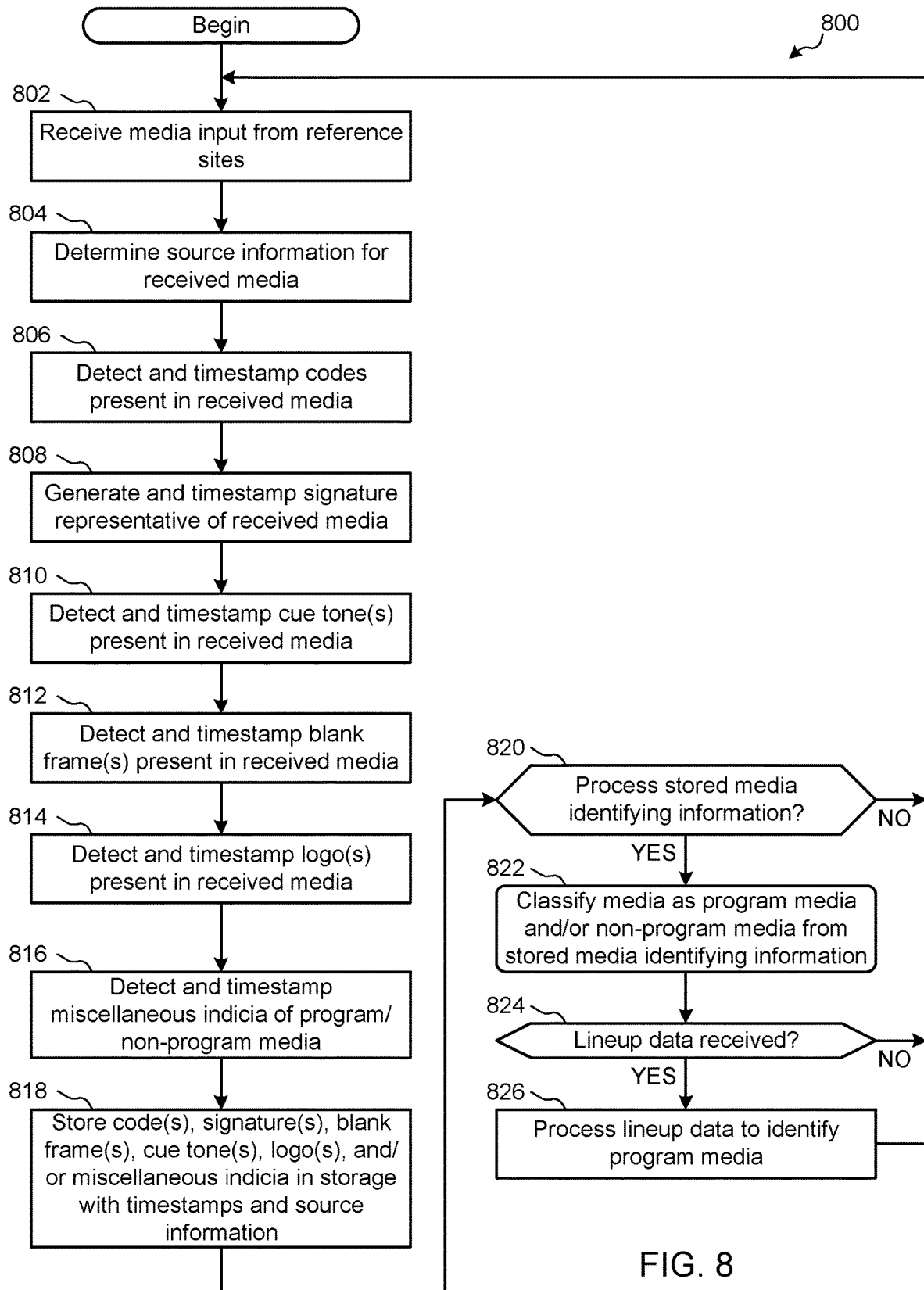
FIG. 8 is a flowchart representative of example machine readable instructions that may be performed by the example linear/non-linear media identifier, the site meters, and/or the log generator of FIGS. 1 and/or 2 to generate a reference log.

FIG. 8 is a flowchart representative of example machine readable instructions 800 that may be performed by the example linear/non-linear media identifier 112, the site meters 115, and/or the log generator 202 of FIGS. 1 and/or 2 to generate a reference log and/or a presentation log. The example instructions 800 of FIG. 8 may be performed the log generator 202 included in the example linear/non-linear media identifier 112 or the example site meters 115 of FIG. 1 to implement block 702 of FIG. 7 to generate a reference log and/or block 704 of FIG. 7 to obtain (e.g., generate) a presentation log.

The example log generator 202 of FIG. 2 receives (e.g., via the log generator 202) media input from one or more reference sites (e.g., the reference sites 106, 108, the site meters 115) (block 802). Example media input includes audio and/or video distributed by the media distributor(s) 110 on one or more channels. The example log generator 202 determines source information for the received media (block 804). For example, the log generator 202 may identify or receive channel information for the channel on which the received media is distributed.

The example code matcher 216 of FIG. 2 detects and timestamps codes (e.g., watermarks) present in the received media (block 806). For example, the code matcher 216 may extract codes embedded in an audio channel of the received media that are used for audience measurement. The code matcher 216 may detect multiple codes (e.g., program media codes and/or non-program media codes) and/or multiple instances of the same code(s) during a media presentation. In some examples, determining the source information in block 804 is based on decoding codes captured by the code matcher 216.

The example signature generator 218 of FIG. 2 generates and timestamps signatures representative of the received media (block 808). For example, the signature generator 218 may repeatedly generate signatures of the audio and/or video channels of the received media to characterize the media presentation, including program media and non-program media present in the received media.

The example cue tone identifier 222 detects and timestamps cue tone(s) present in the received media (block 810). For example, the cue tone identifier 222 may monitor the primary and/or secondary audio channels for cue tones and timestamp the occurrences of cue tones in the audio channel(s) of the received media.

The example blank frame identifier 224 detects and timestamps blank frames present in the received media (block 812). For example, the blank frame identifier 224 may identify blank frames, black frames, and/or any other frame(s) used to indicate or cue the insertion of advertisements.

The example logo identifier 226 detects and timestamps logo(s) present in the received media (block 814). For example, the logo identifier 226 detects logos present in program media by detecting a portion of a video channel of the received media that does not change for a threshold time. The example logo identifier 226 timestamps the beginning and/or the end of the time range that the logo is detected in the received media.

The example log generator 202 of FIG. 2 detects and timestamps any other past, present, and/or future indicia of program media and/or non-program media that are present in the received media (block 816). Examples of such indicia include future cue symbols for insertion of non-program media and/or digitally transmitted messages demarcating and/or identifying program media and/or non-program media.

The example code matcher 216, the example signature generator 218, the example cue tone identifier 222, the example blank frame identifier 224, the example logo identifier 226 and/or, more generally, the log generator 202 of FIG. 2 store the code(s), signature(s), blank frame(s), cue tone(s), logo(s), and/or miscellaneous indicia in the storage device 212 with the corresponding timestamps (and/or time ranges) and the corresponding source information for the received media (block 818). The example code(s), signature(s), blank frame(s), cue tone(s), logo(s), and/or miscellaneous indicia, as well as the timestamps and source information, may constitute a reference log such as the reference logs 300, 400 of FIGS. 3 and 4 and/or a presentation log such as the presentation logs 500, 600 of FIGS. 5 and 6.

The example log generator 202 determines whether to process the stored media identifying information (block 820). For example, the log generator 202 may process the stored media identifying information (e.g., to identify the media based on the media identifying information stored in block 818) continuously or substantially continuously, at designated intervals, and/or in response to a request to process the stored media identifying information. If the log generator 202 is to not process the stored media identifying information (block 820), control returns to block 802 to receive media from the reference sites 106, 108.

When the example log generator 202 determines that it is to process the stored media identifying information (block 820), the log generator 202 classifies media as program media and/or non-program media using the stored media identifying information (block 822). For example, the log generator 202 may use any of the code(s), signature(s), blank frame(s), cue tone(s), logo(s), and/or miscellaneous indicia, and the corresponding timestamps and source information, to identify portions of the received media as program media and/or to identify portions of the received media as non-program media. Example instructions that may be performed by the log generator 202, separately and/or in combination, to identify program media and/or non-program media from the stored media identifying information are described below with reference to FIGS. 9, 10, 11, and 12.

After identifying the program media and non-program media (block 822), the example lineup interpreter 210 determines whether lineup data has been received (block 824). For example, a lineup containing a listing of programs being presented at the times and media sources accessible to the presentation site 102 and the reference sites 106, 108 may be received from the media distributor 110. Example lineup information includes a title of a program, the time slot during which the program is distributed, a source of the program and, for some program media, an identifier of an episode of a program. If lineup data has been received (block 824), the example lineup interpreter 210 processes the lineup data to identify the program media (block 826). For example, the lineup interpreter 210 may add a media identifier for the program media to the reference log based on the timestamp(s) and/or source identifier(s) of the program media. Such media identifiers may be assigned by a program owner or distributor and/or by an audience measurement entity. In the example of FIG. 8, the lineup interpreter 210 does not identify the non-program media because non-program media identification information is not provided in the lineup data. However, the lineup interpreter 210 may identify the non-program media in the reference log using a lineup that identifies non-program media.

After processing the lineup data to identify the program media (block 826), or if lineup data has not been received (block 824), control returns to block 802 to continue receiving media and generating and/or updating the reference log(s). In addition or as an alternative to continuously generating the reference log, control returns to block 704 of FIG. 7 to obtain the media presentation log.

Figure 9:
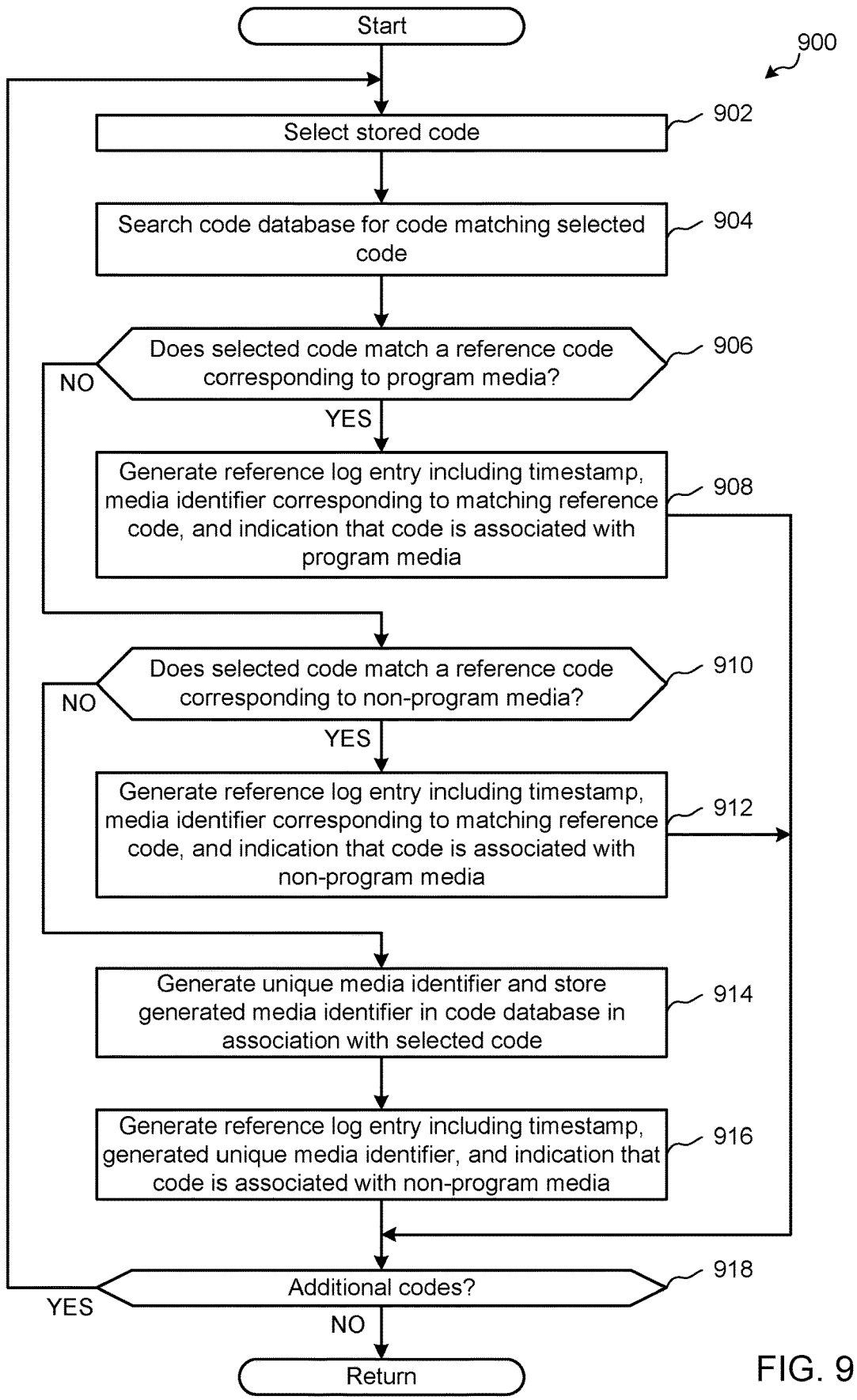
FIG. 9 is a flowchart representative of example machine readable instructions that may be performed by the example linear/non-linear media identifier of FIGS. 1 and/or 2 to identify program media and non-program media based on matching codes.

FIG. 9 is a flowchart representative of example machine readable instructions 900 that may be performed by the example linear/non-linear media identifier 112 of FIGS. 1 and/or 2 to classify media as program media and/or non-program media based on matching codes. The example instructions 900 may be performed by the example code matcher 216 to implement block 822 of FIG. 8, alone or in combination with any of the example instructions of FIGS. 10, 11, and/or 12.

The example code matcher 216 of FIG. 2 selects a stored code (e.g., stored in the storage device 212 of FIG. 2) (block 902). For example, the code matcher 216 may select a code and corresponding timestamp detected in block 806 and/or stored in block 818 of FIG. 8). The code matcher 216 searches a code database (e.g., a code database implemented by the storage device 212) for a code matching the selected code (block 904). For example, the code database may include reference codes and media identifiers corresponding to the reference codes. In some examples in which the reference code represents a source identifier, the code matcher 216 may search the code database based on the source identifier and the corresponding timestamp.

If the example code matcher 216 determines that the selected code matches a reference code corresponding to program media (block 906), the example code matcher 216 generates a reference log entry including a timestamp, the media identifier corresponding to the matching reference code (e.g., in the code database), and an indication that the code is associated with program media (block 908). Examples of reference log entries that may be generated in block 908 are entries 302, 312, 402, and 412 of FIGS. 3 and 4.

If the example code matcher 216 determines that the selected code does not match a reference code corresponding to program media (block 906), but determines that the selected code matches a reference code corresponding to non-program media (block 910), the example code matcher 216 generates a reference log entry including a timestamp, the media identifier corresponding to the matching reference code (e.g., in the code database), and an indication that the code is associated with non-program media (block 912). Examples of reference log entries that may be generated in block 912 are entries 304, 306, 308, 310, 404, 406, 408, and 410 of FIGS. 3 and 4.

If the example code matcher 216 of FIG. 2 determines that the selected code does not match a reference code corresponding to program media (block 906) or a reference code corresponding to non-program media (block 910), the code matcher 216 generates a unique media identifier (e.g., a media identifier not used to identify any other media) and stores the generated media identifier in the code database in association with the selected code (block 914). By storing the code and the generated media identifier in the code database, the example code matcher 216 enables the matching of unknown media in subsequently-processed events in presentation logs based on extracted codes. The example code matcher 216 generates a reference log entry including a timestamp, the generated unique media identifier corresponding to the selected code (e.g., in the code database), and an indication that the code is associated with non-program media (block 916).

The example code matcher 216 determines whether there are additional codes in the stored media identifying information (block 918). If there are additional codes (block 918), control returns to block 902 to select another code. When there are no more codes (block 918), the example instructions 900 of FIG. 9 end and control returns to block 824 of FIG. 8 and/or to block 822 to process additional types of media identifying information.

Figure 10:
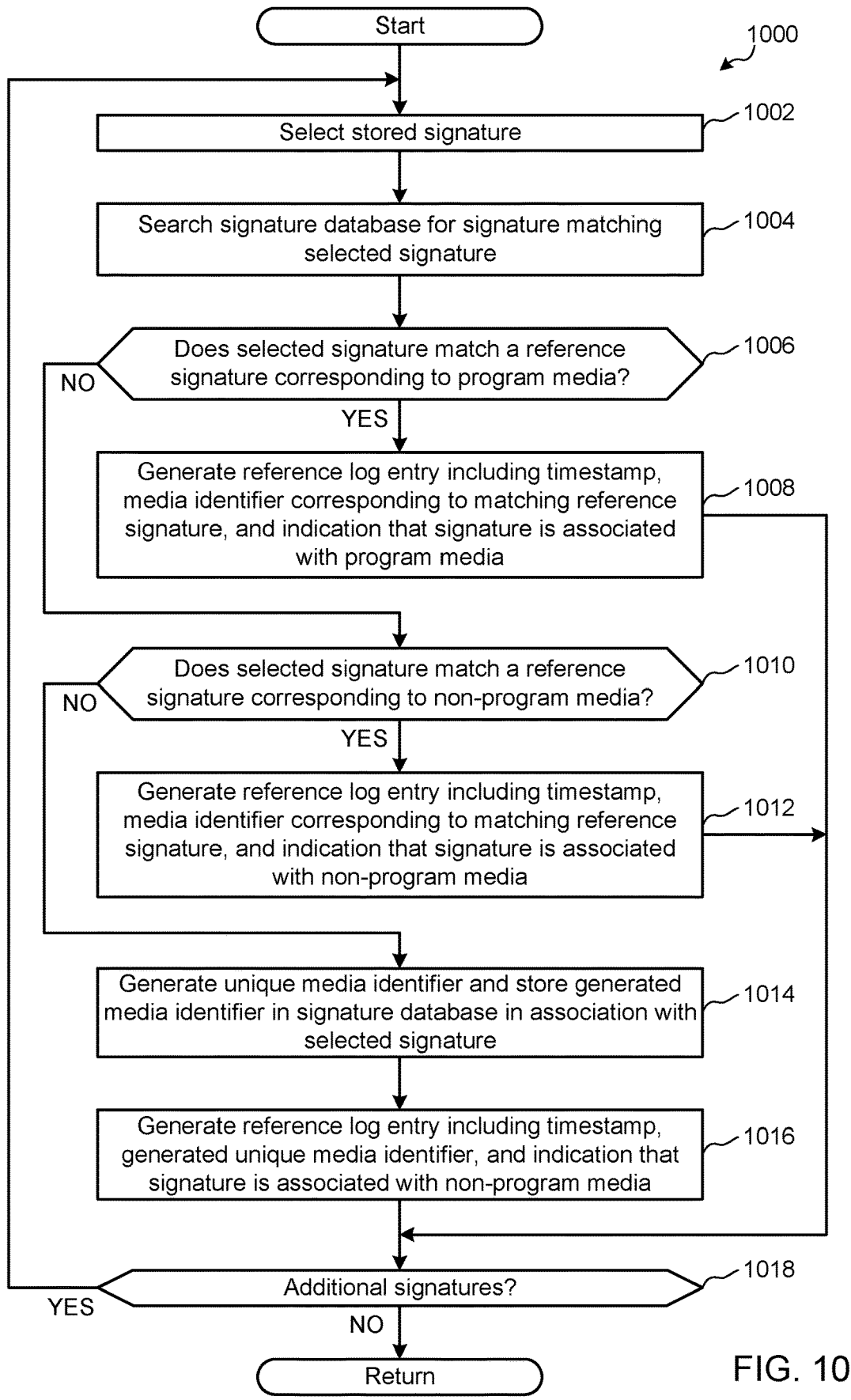
FIG. 10 is a flowchart representative of example machine readable instructions that may be performed by the example linear/non-linear media identifier of FIGS. 1 and/or 2 to identify program media and non-program media based on matching signatures.

FIG. 10 is a flowchart representative of example machine readable instructions 1000 that may be performed by the example linear/non-linear media identifier of FIGS. 1 and/or 2 to identify program media and non-program media based on matching signatures. The example instructions 1000 may be performed by the example signature matcher 220 to implement block 822 of FIG. 8, alone or in combination with any of the example instructions of FIGS. 9, 11, and/or 12.

The example signature matcher 220 of FIG. 2 selects a stored signature (e.g., stored in the storage device 212 of FIG. 2) (block 1002). For example, the signature matcher 220 may select a signature and corresponding timestamp generated by the signature generator 218 in block 808 and/or stored in block 818 of FIG. 8). The signature matcher 220 searches a signature database (e.g., a signature database implemented by the storage device 212) for a signature matching the selected signature (block 1004). For example, the signature database may include reference signatures and media identifiers corresponding to the reference signatures.

If the example signature matcher 220 determines that the selected signature matches a reference signature corresponding to program media (block 1006), the example signature matcher 220 generates a reference log entry including a timestamp, the media identifier corresponding to the matching reference signature (e.g., in the signature database), and an indication that the signature is associated with program media (block 1008). Examples of reference log entries that may be generated in block 1008 are entries 302, 312, 402, and 412 of FIGS. 3 and 4.

If the example signature matcher 220 determines that the selected signature does not match a reference signature corresponding to program media (block 1006), but determines that the selected signature matches a reference signature corresponding to non-program media (block 1010), the example signature matcher 220 generates a reference log entry including a timestamp, the media identifier corresponding to the matching reference signature (e.g., in the code database), and an indication that the signature is associated with non-program media (block 1012). Examples of reference log entries that may be generated in block 1012 are entries 304, 306, 308, 310, 404, 406, 408, and 410 of FIGS. 3 and 4.

If the example signature matcher 220 of FIG. 2 determines that the selected signature does not match a reference signature corresponding to program media (block 1006) or a reference signature corresponding to non-program media (block 1010), the signature matcher 220 generates a unique media identifier (e.g., a media identifier not used to identify any other media) and stores the generated media identifier in the signature database in association with the selected signature (block 1014). By storing the signature and the generated media identifier in the signature database, the example signature matcher 220 enables the matching of unknown media in any presentation logs based on extracted signatures. The example signature matcher 220 generates a reference log entry including a timestamp, the generated unique media identifier corresponding to the selected signature (e.g., in the signature database), and an indication that the signature is associated with non-program media (block 1016).

The example signature matcher 220 determines whether there are additional signatures in the stored media identifying information (block 1018). If there are additional signatures (block 1018), control returns to block 1002 to select another signature. When there are no more signatures (block 1018), the example instructions 1000 of FIG. 10 end and control returns to block 824 of FIG. 8 and/or to block 822 to process additional types of media identifying information.

While the example blocks 1006, 1008, 1010, 1012, 1014, and 1016 are described above with reference to individual signatures, the example signature matcher 220 may perform any or all of blocks 1006-1012 using multiple signatures. For example, the signature matcher 220 may determine whether sets of signatures (e.g., consecutive sets and/or non-consecutive sets) match sets of signatures in the signature database. Using sets of signatures for matching to reference signatures may reduce the likelihood of false matches. In some examples, the signature matcher 220 identifies sets of signatures as signatures occurring between stored media identifying information, such as cue tones and/or blank frames, and/or sets of signatures occurring (or not occurring) during a same time duration as a logo is detected or a same code is identified. Using sets of signatures occurring between other stored media identifying information may increase the likelihood that the signatures are generated from same program media and/or same non-program media.

Figure 11:
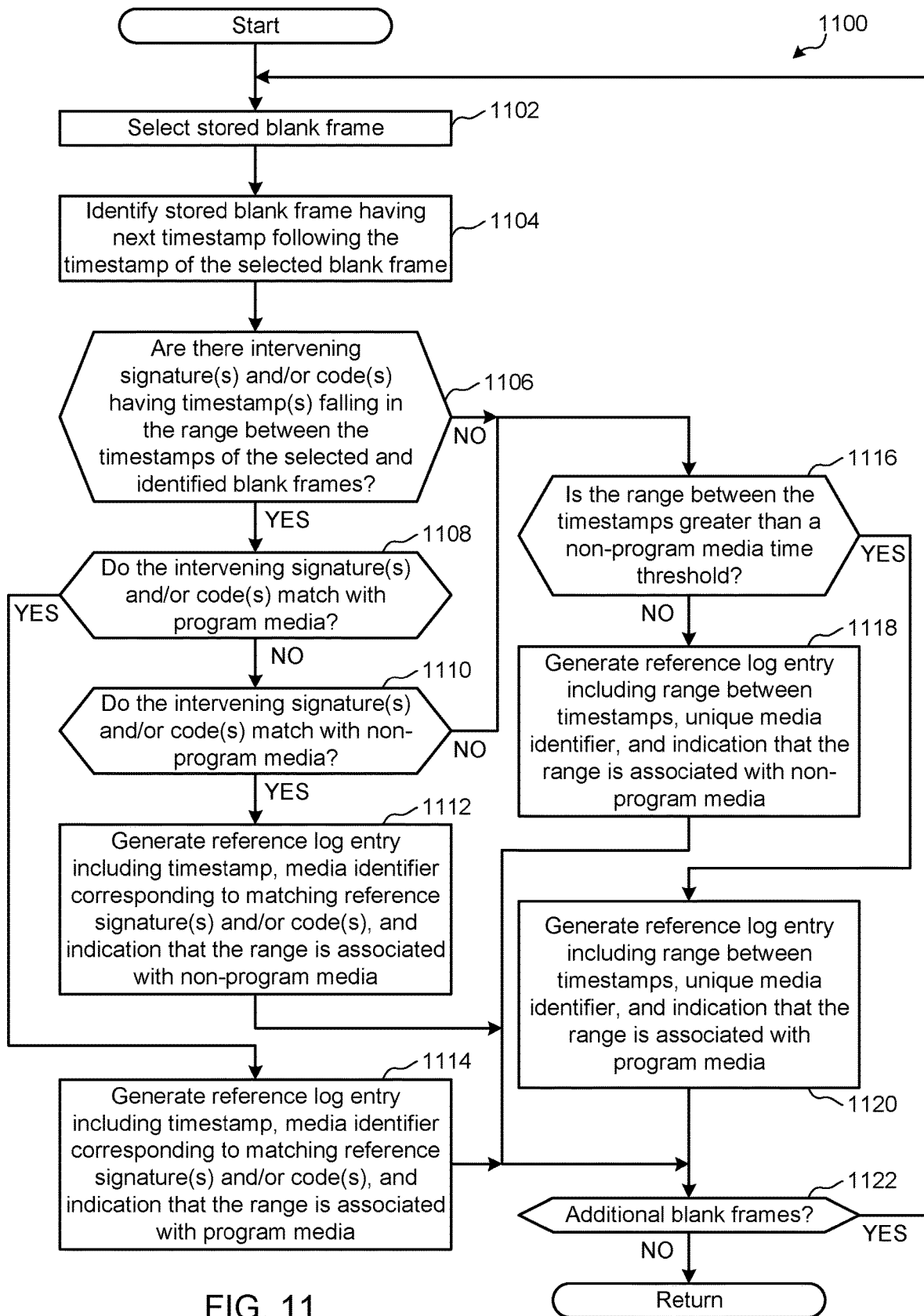
FIG. 11 is a flowchart representative of example machine readable instructions that may be performed by the example linear/non-linear media identifier of FIGS. 1 and/or 2 to identify program media and non-program media based on blank frames and/or cue tones.

FIG. 11 is a flowchart representative of example machine readable instructions 1100 that may be performed by the example linear/non-linear media identifier 112 of FIGS. 1 and/or 2 to identify program media and non-program media based on blank frames and/or cue tones. The example instructions 1100 may be performed by the example cue tone identifier 222 and/or the blank frame identifier 224 to implement block 822 of FIG. 8, alone or in combination with any of the example instructions of FIGS. 9, 10, and/or 12. The example instructions 1100 of FIG. 11 may be performed by the example cue tone identifier 222 to identify program media and non-program media based on cue tones and/or by the blank frame identifier 224 to identify program media and non-program media based on blank frames. While the example instructions 1100 are discussed below with reference to blank frames and the blank frame identifier 224, the example instructions 1100 may be modified to replace the blank frames and the blank frame identifier 224 with cue tones and the cue tone identifier 222, respectively.

The example blank frame identifier 224 selects a stored blank frame (block 1102). For example, the blank frame identifier 224 may select a blank frame and corresponding timestamp identified by the blank frame identifier 224 in block 812 and/or stored in block 818 of FIG. 8). The example blank frame identifier 224 identifies a stored blank frame having a next timestamp following the timestamp of the selected blank frame (block 1104). In other words, the next stored blank frame occurring after the selected blank frame.

The example blank frame identifier 224 determines whether there are intervening signature(s) and/or codes having timestamp(s) falling in the range between the timestamps of the selected blank frame (from block 1102) and the identified blank frame (from block 1104) (block 1106). Because blank frames and cue tones indicate the insertion points for non-program media, the occurrence of generated signatures and extracted codes between the blank frames and/or cue tones may be used to reliably identify the media occurring between those insertion points as distinct media items. If there are intervening signature(s) and/or code(s) (block 1106), the example code matcher 216 and/or the example signature matcher 220 determine whether the intervening signature(s) and/or code(s) match with program media (block 1108).

If the intervening signature(s) and/or code(s) do not match with program media (block 1108), the example code matcher 216 and/or the example signature matcher 220 determine whether the intervening signature(s) and/or code(s) match with non-program media (block 1110). If the intervening signature(s) and/or code(s) match with non-program media (block 1110), the example blank frame identifier 224 generates a reference log entry including the timestamp of the selected stored blank frame (and/or the time range between the timestamps of the selected stored blank frame and the identified stored blank frame), the media identifier corresponding to the matching reference signature(s) and/or code(s), and an indication that the time range is associated with non-program media (block 1112). On the other hand, if the intervening signature(s) and/or code(s) match with program media (block 1108), the example blank frame identifier 224 generates a reference log entry including the timestamp of the selected stored blank frame (and/or the time range between the timestamps of the selected stored blank frame and the identified stored blank frame), the media identifier corresponding to the matching reference signature(s) and/or code(s), and an indication that the time range is associated with program media (block 1114).

If the intervening signature(s) and/or code(s) do not match program media (block 1108) and do not match non-program media (block 1110), or if there are no intervening signature(s) and no intervening code(s) (block 1106), the example blank frame identifier 224 determines whether the range between the timestamps is greater than a non-program media time threshold (block 1116). For example, because non-program media is typically presented in 15-second, 30-second, and/or 60-second blocks and blank frames may cue each non-program media item in a set of non-program media items (e.g., occur at the beginning of a commercial segment and between commercials in the commercial segment), time ranges of less than 60 seconds (or another threshold) between blank frames may indicate that the time range between the blank frames is non-program media. If the range between the timestamps is not greater than the non-program media time threshold (block 1116), the example blank frame identifier 224 generates a reference log entry including the range between the timestamps (e.g., the timestamps of the selected stored blank frame and the identified stored blank frame), a unique media identifier, and an indication that the range is associated with non-program media (block 1118). On the other hand, if the range between the timestamps is greater than the non-program media time threshold (block 1116), the example blank frame identifier 224 generates a reference log entry including the range between the timestamps (e.g., the timestamps of the selected stored blank frame and the identified stored blank frame), a unique media identifier, and an indication that the range is associated with non-program media (block 1120).

After generating a reference log entry (block 1112, block 1114, block 1118, or block 1120), the example blank frame identifier 224 determines whether there are additional blank frames (block 1122). If there are additional blank frames (block 1122), control returns to block 1102 to select another stored blank frame (e.g., the identified stored blank frame of block 1104 or another stored blank frame). When there are no more blank frames (block 1122), the example instructions 1100 of FIG. 11 end and control returns to block 824 of FIG. 8 and/or to block 822 to process additional types of media identifying information.

Figure 12:
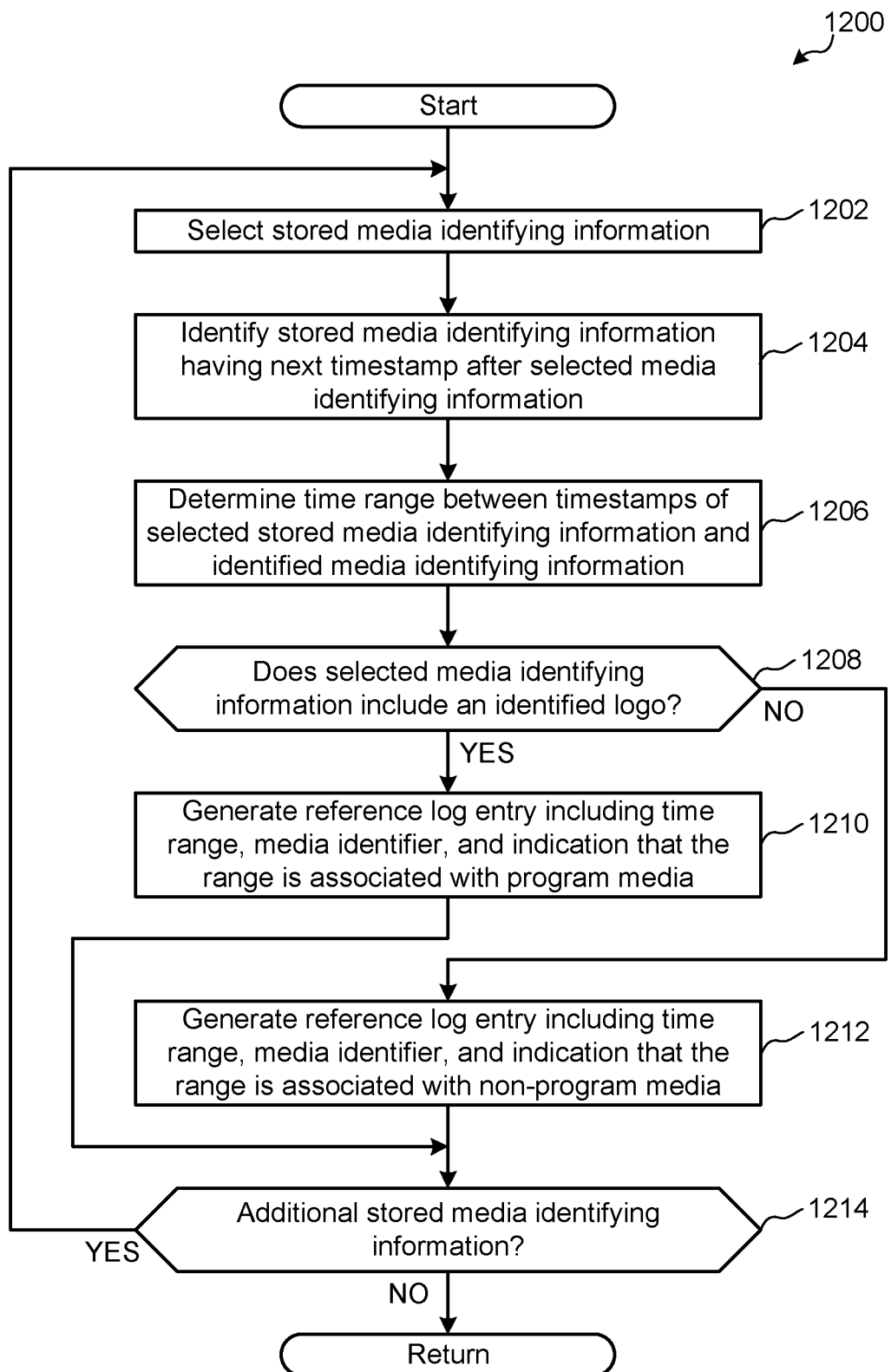
FIG. 12 is a flowchart representative of example machine readable instructions that may be performed by the example linear/non-linear media identifier of FIGS. 1 and/or 2 to identify program media and non-program media based on logos.

FIG. 12 is a flowchart representative of example machine readable instructions 1200 that may be performed by the example linear/non-linear media identifier of FIGS. 1 and/or 2 to identify program media and non-program media based on logos. The example instructions 900 may be performed by the example logo identifier 226 to implement block 822 of FIG. 8, alone or in combination with any of the example instructions of FIGS. 9, 10, and/or 11.

The example logo identifier 226 selects stored media identifying information (e.g., a stored code, a stored generated signature, a stored cue tone, a stored blank frame, a stored logo, etc.) (block 1202). The logo identifier 226 identifies stored media identifying information (e.g., a stored code, a stored generated signature, a stored cue tone, a stored blank frame, a stored logo, etc.) having a next timestamp after the timestamp of the selected media identifying information (block 1204). The example logo identifier 226 determines a time range between the timestamps of the selected media identifying information (from block 1202) and the identified media identifying information (from block 1204) (block 1206).

The example logo identifier 226 determines whether the selected media identifying information includes an identified logo (block 1208). If the selected media identifying information includes a logo (block 1208), the logo identifier 226 generates a reference log entry including the time range of the selected media identifying information, a media identifier, and an indication that the time range is associated with program media (block 1210). On the other hand, if the selected media identifying information does not include an identified logo (block 1208), the example logo identifier 226 generates a reference log entry including the time range of the selected media identifying information, a media identifier, and an indication that the time range is associated with non-program media (block 1212).

After generating a reference log entry (block 1210 or block 1212), the example logo identifier 226 determines whether there is additional stored media identifying information (block 1214). If there is additional stored media identifying information (block 1214), control returns to block 1202 to select next stored media identifying information. When there is no more stored media identifying information (block 1214), the example instructions 1200 of FIG. 12 end and control returns to block 824 of FIG. 8 and/or to block 822 to process additional types of media identifying information.

Figure 13:
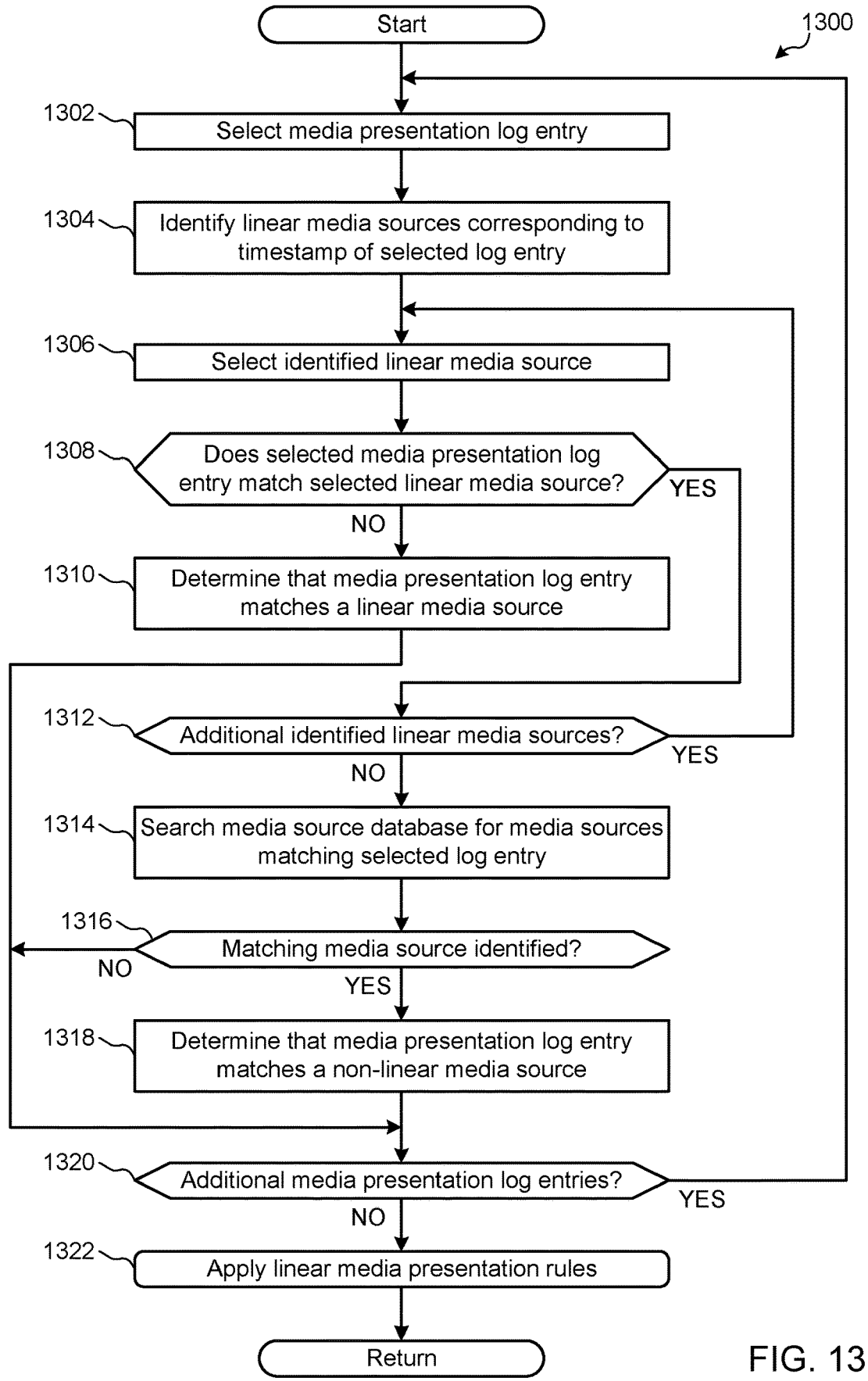
FIG. 13 is a flowchart representative of example machine readable instructions that may be performed by the example linear/non-linear media identifier of FIGS. 1 and/or 2 to determine whether program media corresponds to a linear or non-linear media presentation.

FIG. 13 is a flowchart representative of example machine readable instructions 1300 that may be performed by the example linear/non-linear media identifier 112 of FIGS. 1 and/or 2 to determine whether program media corresponds to a linear or non-linear media presentation. The instructions 1300 of FIG. 13 may be performed by the example log comparator 206 of FIG. 2 to implement block 706 of FIG. 7.

The example log comparator 206 selects a media presentation log entry (block 1302). For example, the log comparator 206 may select one of the example log entries 502-512, 602 of FIGS. 5 and/or 6. The log comparator 206 determines linear media sources corresponding to the timestamp of the selected log entry (block 1304). For example, the log comparator 206 identifies the reference log entries generated based on media monitored at the reference site(s) 106, 108 at the same time(s) as the timestamp and/or time range of the selected log entry. In some examples, the log comparator 206 may limit the identified media to reference log entries having durations that are similar, identical, or substantially identical to the duration of the selected media presentation log entry. In the example of the log entry 502 of FIG. 5, the log comparator 206 may determine the program media and/or non-program media presented on media sources available to the presentation site 102 between 9:00:00 and 9:10:00 on Nov. 13, 2013 and/or the program media and/or non-program media (and/or contiguous portions of the media) having a duration of approximately 10 minutes.

The example log comparator 206 selects one of the identified linear media sources (block 1306) and determines whether the selected media presentation log entry matches the selected linear media source (block 1108). For example, the log comparator 206 may determine whether the selected media presentation log entry and a reference log entry generated from the selected media source have a same media identifier and substantially a same timestamp, time range, and/or time duration. If the selected media presentation log entry matches the selected linear media source (block 1308), the example log comparator 206 determines that the media presentation log entry matches a linear media presentation (block 1310). The log comparator 206 may determine a match to include matching all of the log fields, one or more key (e.g., controlling) log fields, or a threshold portion of the log fields.

If the selected media presentation log entry does not match the selected linear media source (block 1308), the log comparator 206 determines whether there are additional identified linear media sources (block 1312). If there are additional linear media sources for comparison (block 1312), control returns to block 1306 to select another linear media source.

If there are no additional linear media sources (block 1312), the example log comparator 206 searches a media source database for media sources matching the selected log entry (block 1314). For example, the log comparator 206 may search the storage device 212 for reference log entries having a matching media identifier, but possibly having a different timestamp and/or a different time duration. For example, searching the media source database may identify a media source occurring at a prior time or a media source that is an on-demand or other user-controlled media source. If a matching media source is identified in the database (block 1314), the example log comparator 206 determines that the selected media presentation log entry matches a non-linear media presentation (block 1318).

After determining that the selected media presentation log entry matches a linear presentation (block 1310) or matches a non-linear presentation (block 1318), or if a matching media source is not identified (block 1316), the log comparator 206 determines whether there are additional media presentation log entries (block 1320). If there are additional media presentation log entries (block 1320), control returns to block 1302 to select another media presentation log entry. When there are no more media presentation log entries (block 1320), the example presentation classifier 208 applies linear media presentation rules to, for example, classify the matching linear media sources and/or non-linear media sources as linear media presentations and/or non-linear media presentations (block 1322). Example instructions that may be performed by the presentation classifier 208 to implement block 1322 are described below with reference to FIG. 14. After applying the linear presentation rules (block 1322), the example instructions 1300 of FIG. 13 end and control returns to block 708 of FIG. 7.

Figure 14:
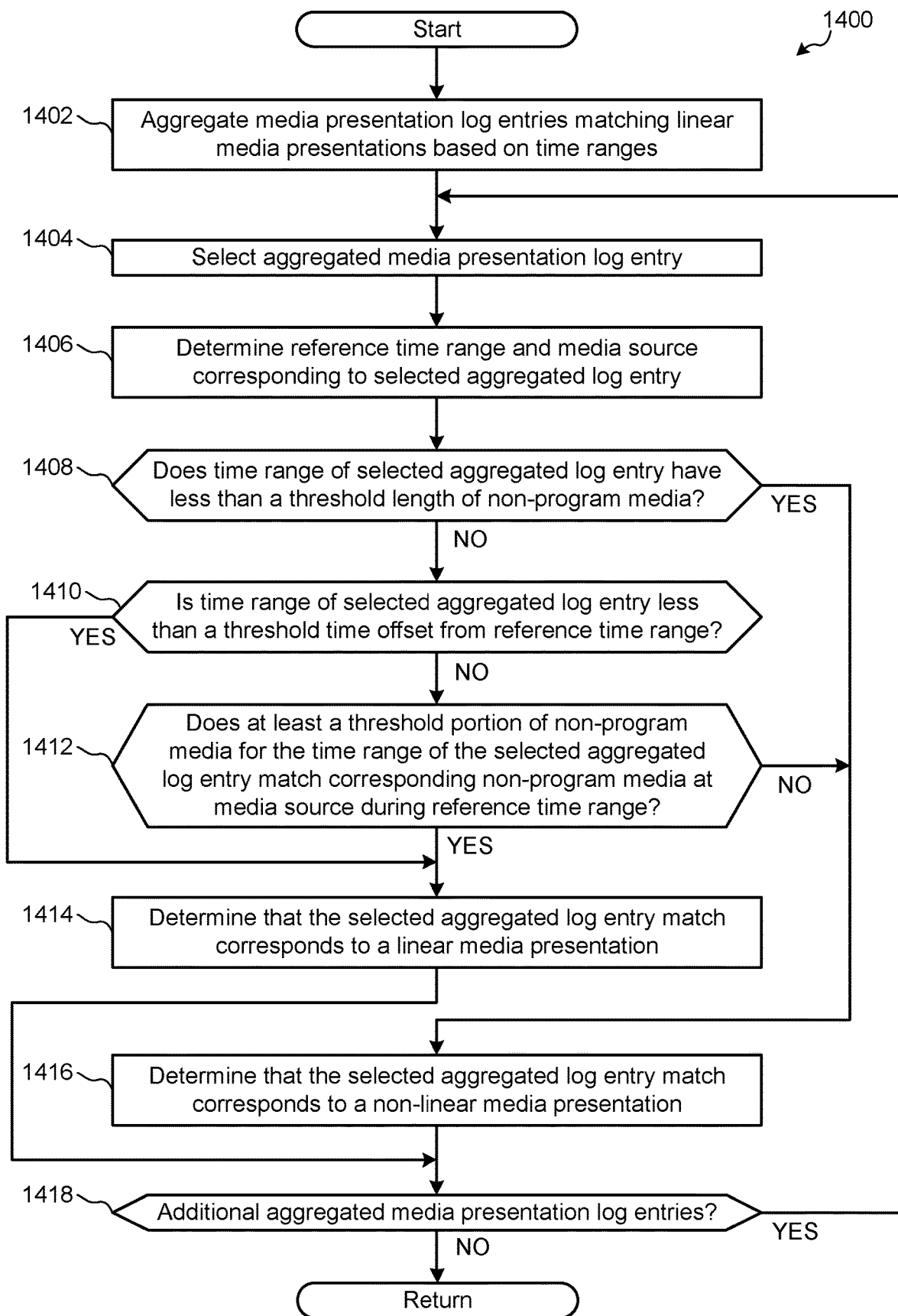
FIG. 14 is a flowchart representative of example machine readable instructions that may be performed by the example linear/non-linear media identifier of FIGS. 1 and/or 2 to apply linear media presentation rules to determine whether program media corresponds to a linear or non-linear media presentation.

FIG. 14 is a flowchart representative of example machine readable instructions 1400 that may be performed by the example linear/non-linear media identifier of FIGS. 1 and/or 2 to apply linear media presentation rules to determine whether program media corresponds to a linear or non-linear media presentation. The example instructions 1400 of FIG. 14 may be performed by the presentation classifier 208 of FIG. 2 to implement block 1322 of FIG. 13.

The example presentation classifier 208 of FIG. 2 (or the example log comparator 206) aggregates media presentation log entries matching linear media presentations based on time ranges (block 1402). For example, the presentation classifier 208 may aggregate consecutive media presentation log entries having a same media identifier into a single entry with a single contiguous time range. In some examples, the presentation classifier aggregates or groups media presentation log entries associated with program media and having the same media identifier (e.g., the log entries 502 and 512 of FIG. 5), and any intervening media presentation log entries associated with non-program media (e.g., the log entries 504-510 of FIG. 5 occurring between portions of the program media identified in the log entries 502 and 512). In some examples, aggregation of log entries is omitted. In such examples, the linear classification rules may be modified to, for example, set an appropriate threshold for matching entries to classify a presentation as linear.

The example presentation classifier 208 selects an aggregated media presentation log entry (e.g., an aggregated log entry or group of aggregated log entries) (block 1404). The presentation classifier 208 may alternatively select a media presentation log entry that has not been aggregated from other media presentation log entries (e.g., the log entry 602 of FIG. 6). The presentation classifier 208 determines a reference time range and a media source corresponding to the selected log entry (block 1406). For example, the presentation classifier 208 determines the channel and time range of the linear media source that matches the media identifier of the selected log entry. In the example group of log entries 502-512 of FIG. 5, the example presentation classifier 208 determines the channel of the linear media source to be the media source A102 and the time range of presentation to be Nov. 12, 2013, from 8:00:00-8:21:00 from the example reference log 400 of FIG. 4 based on the media identifiers P5545, N3523, N9877, N6545, and N2123 in the entries 502-512. In the example log entry 602 of FIG. 6, the example presentation classifier 208 determines the channel of the linear media source to be the media source A102 and the time range to be Nov. 12, 2013, from 8:00:00-8:21:00 from the example reference log 400 of FIG. 4 based on the media identifier P5545 in the event 602.

The example presentation classifier 208 determines whether the aggregated time range of the selected aggregated media presentation log entry satisfies a threshold length of non-program media (block 1408). Block 1408 corresponds to an example linear media presentation rule specifying that media presentations not satisfying a threshold length of non-program media are likely to be non-linear media presentations such as on-demand and/or subscription presentations.

If the aggregated time range of the selected aggregated media presentation log entry has at least a threshold length of non-program media (block 1408), the example presentation classifier 208 determines whether the aggregated time range of the selected aggregated media presentation log entry has less than a threshold time offset from the reference time range (block 1410). Block 1410 corresponds to an example linear media presentation rule specifying that media presentations that are less than a threshold time offset from reference media presentations may be due to factors such as clock offsets between the site meters 114, 115, or instances in which an audience member pauses a linear presentation for a short time using a DVR pause feature of a set top box. For example, the presentation classifier 208 may compare the media offset field 520 of the selected log entry 502 or 602 to a threshold representative of an upper expected clock mismatch between the site meters 114 and the site meters 115 of FIG. 1. In some examples, such as example systems that implement a synchronization routine between site meters 114, 115, the example rule and/or block 1410 may be omitted.

If the aggregated time range of the selected aggregated media presentation log entry has at least a threshold time offset from the reference time range (block 1410), the example presentation classifier 208 determines whether at least a threshold portion of the non-program media during the time range of the selected aggregated media presentation log entry (or group of entries) match corresponding non-program media presented by the media source during the reference time range (block 1412). Block 1412 corresponds to an example linear media presentation rule specifying that a media presentation that has at least a threshold percentage of matching non-program media (e.g., advertisements) is considered a linear media presentation. For example, if a linear media presentation is time-shifted from its originally scheduled presentation time to a later time, but the non-program media were also recorded and presented during the time-shifted presentation, the linear media presentation may be validly credited with the time-shifted presentation because at least a threshold percentage of the non-program media (e.g., advertisements) were presented instead of being skipped.

If at least the threshold percentage of the non-program media during the time range of the selected aggregated media presentation log entry (or group of entries) match corresponding non-program media presented by the media source during the reference time range (block 1412), and/or if the time range of the selected aggregated media presentation log entry has less than a threshold time offset from the reference time range (block 1410), the example presentation classifier 208 determines or classifies the selected aggregated media presentation log entry (or group of entries) to correspond to a linear media presentation (block 1414). Conversely, if less than the threshold percentage of the non-program media during the time range of the selected aggregated media presentation log entry (or group of entries) match corresponding non-program media presented by the media source during the reference time range (block 1412), and/or if the time range of the selected aggregated media presentation log entry has less than a threshold length of non-program media (block 1408), the example presentation classifier 208 determines or classifies the selected aggregated media presentation log entry (or group of entries) to correspond to a non-linear media presentation (block 1416).

After classifying the selected aggregated media presentation log entry as a linear media presentation (block 1414) or as a non-linear media presentation (block 1416), the example presentation classifier 208 determines whether there are additional aggregated media presentation log entries to be classified (block 1418). If there are additional aggregated media presentation log entries (block 1418), control returns to block 1404 to select a next aggregated log entry. When there are no more aggregated media presentation log entries (block 1418), the example instructions 1400 of FIG. 14 end and control returns to block 708 of FIG. 7.

While example linear media presentation rules are disclosed and implemented in FIG. 14 by determining that a media presentation corresponds to a linear or non-linear media presentation based on matching a rule, in other examples the instructions 1400 implement a weight system in which each of the rules applies a corresponding weight or value to the determination of a linear or non-linear media presentation. If the total weight after matching the applicable rules is greater than (or equal to) a threshold, the example presentation classifier 208 determines that the selected aggregated media presentation log entry corresponds to a linear media presentation. Conversely, if the total weight after matching the applicable rules is less than (or equal to) a threshold, the example presentation classifier 208 determines that the selected aggregated media presentation log entry corresponds to a non-linear media presentation. Furthermore, any other rules indicative of whether the selected aggregated media presentation log entry is a linear or non-linear media presentation may be included.

Figure 15:
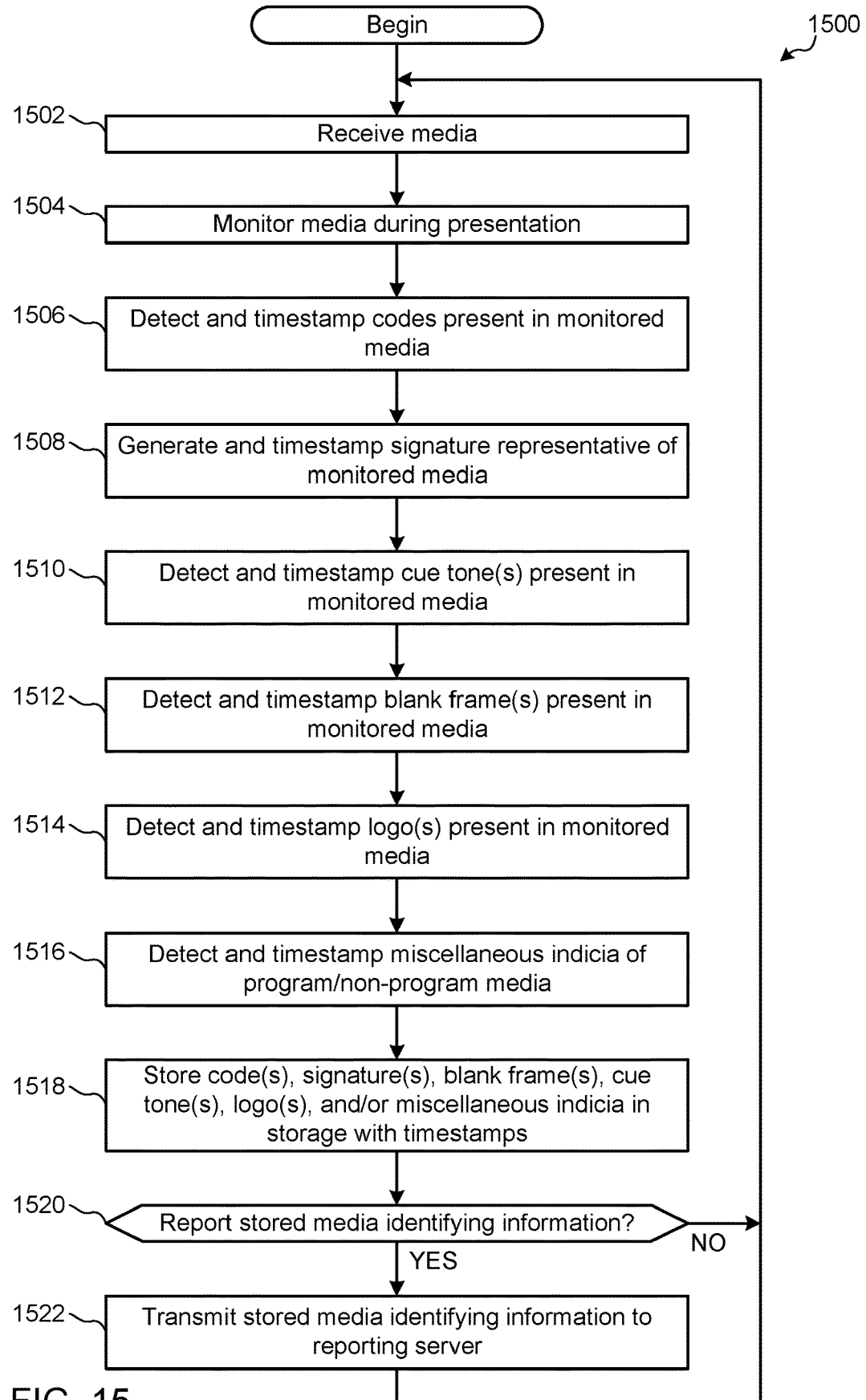
FIG. 15 is a flowchart representative of example machine readable instructions that may be performed by any of the example site meters, the example media presentation devices, and/or the example device meters of FIG. 1 to provide media presentation information to the linear/non-linear media identifier of FIGS. 1 and/or 2.

FIG. 15 is a flowchart representative of example machine readable instructions 1500 that may be performed by any of the example site meters 114, 115, the example media presentation devices 116, 120, and/or the example device meters 130 of FIG. 1 to provide media presentation information to the linear/non-linear media identifier 112 of FIGS. 1 and/or 2. The example instructions 1500 of FIG. 15 will be described below with reference to the example device meter 130, including a log generator such as the log generator 202 of FIG. 2, and the example media presentation device 120.

The example media presentation device 116 of FIG. 1 receives (e.g., via the log generator 202) media to be presented via the media presentation device 116 (block 1502). Example media input includes audio and/or video distributed by the media distributor(s) 110 on one or more channels and/or media streams. The example device meter 130 of FIG. 1 (e.g., via a log generator 202) monitors the media during presentation of the media on the media presentation device 116 (block 1504). For example, the device meter 130 may monitor audio and/or video in the received media as the media is presented.

The code matcher 216 of the example device meter 130 detects and timestamps codes (e.g., watermarks) present in the received media (block 1506). For example, the code matcher 216 may extract codes embedded in an audio channel of the received media that are used for audience measurement. The code matcher 216 may detect multiple codes (e.g., program media codes and/or non-program media codes) and/or multiple instances of the same code(s) during a media presentation.

The signature generator 218 of the example device meter 130 generates and timestamps signatures representative of the received media (block 1508). For example, the signature generator 218 may repeatedly generate signatures of the audio and/or video channels of the received media to characterize the media presentation, including program media and non-program media present in the received media.

The cue tone identifier 222 of the example device meter 130 detects and timestamps cue tone(s) present in the received media (block 1510). For example, the cue tone identifier 222 may monitor the primary and/or secondary audio channels for cue tones and timestamp the occurrences of cue tones in the audio channel(s) of the received media.

The blank frame identifier 224 of the example device meter 130 detects and timestamps blank frames present in the received media (block 1512). For example, the blank frame identifier 224 may identify blank frames, blank frames, and/or any other frame(s) used to indicate or cue the insertion of advertisements.

The logo identifier 226 of the example device meter 130 detects and timestamps logo(s) present in the received media (block 1514). For example, the logo identifier 226 detects logos present in program media by detecting a portion of a video channel of the received media that does not change for a threshold time. The example logo identifier 226 timestamps the beginning and/or the end of the time range that the logo is detected in the received media.

The log generator 202 of the example device meter 130 detects and timestamps any other past, present, and/or future indicia of program media and/or non-program media that are present in the received media (block 1516). Examples of such indicia include future cue symbols for insertion of non-program media and/or digitally transmitted messages demarcating and/or identifying program media and/or non-program media.

The example code matcher 216, the example signature generator 218, the example cue tone identifier 222, the example blank frame identifier 224, the example logo identifier 226 and/or, more generally, the log generator 202 of the example device meter 130 stores the code(s), signature(s), blank frame(s), cue tone(s), logo(s), and/or miscellaneous indicia in a storage device with the corresponding timestamps (and/or time ranges) (block 1518). The example code(s), signature(s), blank frame(s), cue tone(s), logo(s), and/or miscellaneous indicia, as well as the timestamps and source information, may constitute a reference log such as the reference logs 300, 400 of FIGS. 3 and 4.

The example device meter 130 determines whether to report the stored media identifying information (block 1520). For example, the device meter 130 may report the stored media identifying information periodically (e.g., at designated intervals) and/or aperiodically (e.g., on demand, when a threshold number of events have occurred, etc.). If the device meter 130 is to report the stored media identifying information (block 1520), the example device meter 130 transmits the stored media identifying information to the linear/non-linear media identifier (block 1522). For example, the device meter 130 may use a data connection of the media presentation device 116 to transmit the media identifying information to the linear/non-linear media identifier 112 via the network 132 of FIG. 1. After transmitting the stored media identifying information (block 1522), or if the device meter 130 determines that it is not to report the stored media identifying information (block 1520), control returns to block 1502 to continue receiving media and generating media identifying information.

Figure 16:
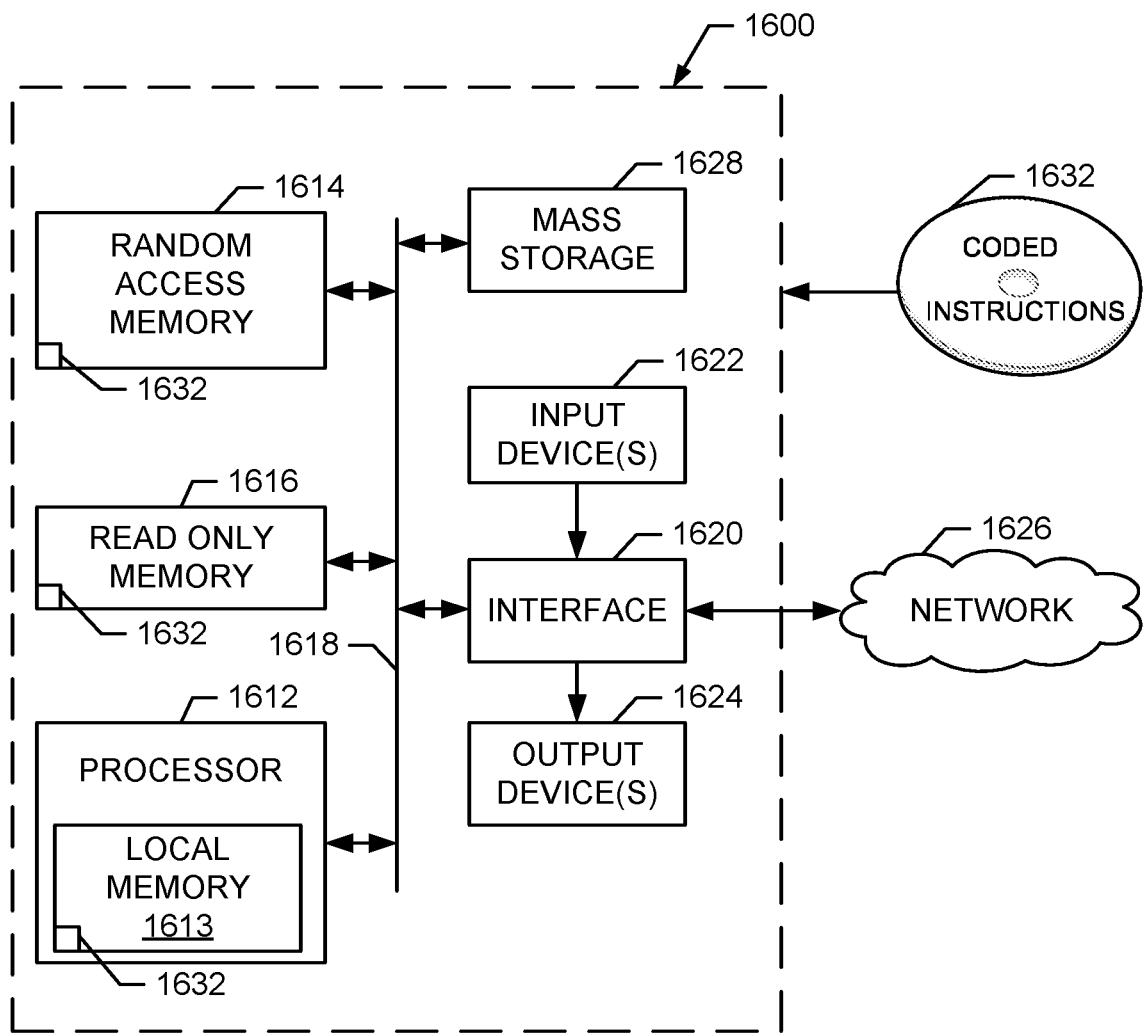
FIG. 16 is a block diagram of an example processor platform capable of executing the instructions of FIGS. 7, 8, 9, 10, 11, 12, 13, 14, and/or 15 to implement the apparatus of FIGS. 1 and/or 2.

FIG. 16 is a block diagram of an example processor platform 1600 capable of executing the instructions of FIGS. 7, 8, 9, 10, 11, 12, 13, 14, and/or 15 to implement the linear/non-linear media identifier 112, the example site meters 114, 115, the example media presentation devices 116, 120, and/or the device meter 130 of FIGS. 1 and/or 2. The processor platform 1600 can be, for example, a server, a personal computer, a laptop computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 7-15 may be stored in the mass storage device 1628, in the volatile memory 1614, in the non-volatile memory 1616, and/or on a removable tangible computer readable storage medium such as a CD or DVD.

Example systems, methods, and apparatus disclosed herein provide more accurate and/or more granular audience measurement information for linear and non-linear media presentations by automatically classifying media presentations as linear or non-linear instead of grouping presentations together for measurement. By identifying media presentations as program media and/or non-program media, and then matching patterns or combinations of the program media and/or non-program media from presentation logs with stored patterns or combinations from reference logs, example systems, methods, and apparatus disclosed herein reduce or eliminate human intervention (and, thus, reduce costs and/or errors) to identify media presentations as linear presentations and/or non-linear presentations.

Furthermore, example systems, methods, and apparatus disclosed herein significantly reduce data storage capacities that may be required to perform manual linear and/or non-linear presentation identification. For example, example systems, methods, and apparatus reduce (e.g., transform) monitored media to smaller, representative reference logs and presentation logs (e.g., smaller files) for comparison, instead of transmitting and/or storing the media files (e.g., audio and/or video data, which is larger than a log or representative file) for manual identification or comparison with other media.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to automatically determine whether a media presentation is a linear media presentation or a non-linear media presentation, the apparatus comprising:
   one or more processors; and
   memory including computer readable instructions which, when executed, cause the one or more processors to at least:
      obtain at least one of an audio fingerprint or a watermark code generated by a media monitoring device electronically monitoring the media presentation of first media;
      identify first media identifiers of the first media from the at least one of the audio fingerprint or the watermark code by comparing the at least one of the audio fingerprint or the watermark code to a reference audio fingerprint or a reference watermark code;
      generate a media presentation log for the media presentation of the first media, the media presentation log including first media identifiers of the first media and first times at which the first media was presented;
      generate a reference log including second media identifiers of second media and second times at which the second media was presented as a linear media presentation;
      compare the media presentation log to the reference log to determine a duration associated with matches between ones of the first media identifiers and ones of the second media identifiers, the matches between the ones of the first media identifiers and the ones of the second media identifiers being in a same order in the media presentation log and the reference log, the duration based on at least one of the first times or the second times; and
      classify the media presentation of the first media as a linear media presentation when the duration satisfies a threshold.

2. The apparatus as defined in claim 1, wherein the computer readable instructions, when executed, further cause the one or more processors to classify the media presentation of the first media as a non-linear media presentation when the duration does not satisfy the threshold.

3. The apparatus as defined in claim 1, wherein the first media includes first program media and first non-program media, and the second media includes second program media and second non-program media.

4. The apparatus as defined in claim 1, wherein the media presentation log includes an identification of a first portion of the first media as program media and a second portion of the first media as non-program media.

5. The apparatus as defined in claim 4, wherein the media presentation log includes the identification of the first portion of the first media as program media in response to a code present in the first portion of the first media matching a reference code associated with reference program media.

6. The apparatus as defined in claim 4, wherein the media presentation log includes the identification of the first portion of the first media as program media in response to a signature generated based on the first portion of the first media matching a reference signature associated with reference program media.

7. The apparatus as defined in claim 4, wherein the media presentation log includes the identification of the second portion of the first media as non-program media in response to presentation of the second portion of the first media following a blank frame present in the first media.

8. The apparatus as defined in claim 4, wherein the media presentation log includes the identification of the second portion of the first media as non-program media in response to presentation of the second portion of the first media following a cue tone present in the first media.

9. The apparatus as defined in claim 4, wherein the media presentation log includes the identification of the first portion of the first media as program media in response to detection of a logo in the first portion of the first media.

10. The apparatus as defined in claim 1, wherein the audio fingerprint is based on an audio characteristic of the first media electronically measured at discrete times by the media monitoring device.

11. An apparatus to automatically determine whether a media presentation is a linear media presentation or a non-linear media presentation, the apparatus comprising:
    one or more processors; and
    memory including computer readable instructions which, when executed, cause the one or more processors to at least:
       obtain at least one of an audio fingerprint or a watermark code generated by a media monitoring device electronically monitoring the media presentation of first media;
       identify first media identifiers of the first media from the at least one of the audio fingerprint or the watermark code by comparing the at least one of the audio fingerprint or the watermark code to a reference audio fingerprint or a reference watermark code;
       generate a media presentation log for the media presentation of the first media, the media presentation log including first media identifiers of the first media and first times at which the first media was presented;
       generate a reference log including second media identifiers of second media and second times at which the second media was presented as a linear media presentation;
       compare the media presentation log to the reference log to determine a number of matches between ones of the first media identifiers and ones of the second media identifiers, the matches between the ones of the first media identifiers and the ones of the second media identifiers being in a same order in the media presentation log and the reference log; and
       classify the media presentation of the first media as a linear media presentation when the number of matches satisfies a threshold.

12. The apparatus as defined in claim 11, wherein the computer readable instructions, when executed, further cause the one or more processors to classify the media presentation of the first media as a non-linear media presentation when the number of matches does not satisfy the threshold.

13. The apparatus as defined in claim 11, wherein the first media includes first program media and first non-program media, and the second media includes second program media and second non-program media.

14. The apparatus as defined in claim 11, wherein the media presentation log includes an identification of a first portion of the first media as program media and a second portion of the first media as non-program media.

15. The apparatus as defined in claim 14, wherein the media presentation log includes the identification of the first portion of the first media as program media in response to a code present in the first portion of the first media matching a reference code associated with reference program media.

16. The apparatus as defined in claim 14, wherein the media presentation log includes the identification of the first portion of the first media as program media in response to a signature generated based on the first portion of the first media matching a reference signature associated with reference program media.

17. The apparatus as defined in claim 14, wherein the media presentation log includes the identification of the second portion of the first media as non-program media in response to presentation of the second portion of the first media following a blank frame present in the first media.

18. The apparatus defined in claim 14, wherein the media presentation log includes the identification of the second portion of the first media as non-program media in response to presentation of the second portion of the first media following a cue tone present in the first media.

19. The apparatus as defined in claim 14, wherein the media presentation log includes the identification of the first portion of the first media as program media in response to detection of a logo in the first portion of the first media.

20. The apparatus as defined in claim 11, wherein the audio fingerprint is based on an audio characteristic of the first media electronically measured at discrete times by the media monitoring device.

* * * * *